United States Patent
Khoshnevis et al.

(10) Patent No.: US 9,729,273 B2
(45) Date of Patent: Aug. 8, 2017

(54) COLLISION RESOLUTION AMONG TRANSMISSION SCHEDULES OF UPLINK CONTROL INFORMATION (UCI)

(75) Inventors: Ahmad Khoshnevis, Portland, OR (US); Shohei Yamada, Camas, WA (US)

(73) Assignee: Sharp Kabushiki Kaisha, Sakai (JP)

(*) Notice: Subject to any disclaimer, the term of this patent is extended or adjusted under 35 U.S.C. 154(b) by 18 days.

(21) Appl. No.: 13/436,530

(22) Filed: Mar. 30, 2012

(65) Prior Publication Data
US 2013/0258874 A1    Oct. 3, 2013

(51) Int. Cl.
| | |
|---|---|
| H04L 1/00 | (2006.01) |
| H04L 5/00 | (2006.01) |
| H04B 7/024 | (2017.01) |
| H04B 7/0417 | (2017.01) |
| H04B 7/06 | (2006.01) |

(52) U.S. Cl.
CPC .......... H04L 1/0027 (2013.01); H04L 1/0031 (2013.01); H04L 5/0057 (2013.01); H04L 5/0064 (2013.01); H04B 7/024 (2013.01); H04B 7/0417 (2013.01); H04B 7/063 (2013.01); H04B 7/0639 (2013.01); H04L 1/0026 (2013.01); H04L 5/001 (2013.01)

(58) Field of Classification Search
CPC ... H04L 1/0026; H04L 1/0027; H04L 1/0031; H04L 1/1671; H04L 5/001; H04L 12/26; H04L 1/1812; H04L 5/0057; H04L 5/0064; H04L 1/0029; H04L 1/003; H04L 1/1861; H04L 5/0023; H04L 5/0053; H04L 1/1635; H04W 24/10; H04W 28/044; H04W 88/08; H04W 28/04; H04W 72/082; H04W 72/1226; H04W 72/1242; H04W 8/22; H04W 72/04; H04W 72/10; H04W 72/0406; H04B 7/024; H04B 7/0417; H04B 7/063; H04B 7/0639
USPC .................................................. 370/351–356
See application file for complete search history.

(56) References Cited

U.S. PATENT DOCUMENTS

| | | |
|---|---|---|
| 2010/0098012 A1 | 4/2010 | Bala et al. |
| 2011/0141928 A1 | 6/2011 | Shin et al. |

(Continued)

FOREIGN PATENT DOCUMENTS

| | | |
|---|---|---|
| WO | 2010/148319 | 12/2010 |
| WO | 2011/019795 | 2/2011 |

OTHER PUBLICATIONS

3GPP TS 36.211 V9.0.0, "Evolved Universal Terrestrial Radio Access (E-UTRA); Physical Channels and Modulation (Release 9)," Dec. 2009.

(Continued)

*Primary Examiner* — Andrew Lai
*Assistant Examiner* — M Mostazir Rahman
(74) *Attorney, Agent, or Firm* — Keating & Bennett, LLP

(57) ABSTRACT

A method for reporting uplink control information (UCI) on a user equipment (UE) is described. Multiple channel state information (CSI) reports are generated for multiple channel state information reference signals (CSI-RS) received on a serving cell. The multiple CSI-RS reports are scheduled to be transmitted in a subframe. An overall highest priority CSI report is determined using a method of prioritization. The overall highest priority CSI report is selected. The overall highest priority CSI report is transmitted.

3 Claims, 13 Drawing Sheets

(56) References Cited

U.S. PATENT DOCUMENTS

| | | | |
|---|---|---|---|
| 2011/0242982 A1* | 10/2011 | Lunttila et al. | 370/241 |
| 2012/0076028 A1* | 3/2012 | Ko et al. | 370/252 |
| 2012/0220286 A1* | 8/2012 | Chen et al. | 455/422.1 |
| 2013/0114455 A1* | 5/2013 | Yoo et al. | 370/252 |
| 2013/0148613 A1* | 6/2013 | Han et al. | 370/329 |
| 2013/0195048 A1* | 8/2013 | Ekpenyong et al. | 370/329 |
| 2013/0208665 A1* | 8/2013 | Baldemair | H04L 1/0031 370/329 |
| 2013/0242902 A1* | 9/2013 | Liu et al. | 370/329 |

OTHER PUBLICATIONS

3GPP TS 36.213 V8.6.0, "Evolved Universal Terrestrial Radio Access (E-UTRA); Physical Layer Procedures (Release 8)," Mar. 2009.

Potevio, "UCI Multiplexing for Simultaneous PUSCH/PUCCH," 3GPP TSG RAN WG1 Meeting #63b, R1-110360, Jan. 2011.

Alcatel-Lucent Shanghai Bell, Alcatel-Lucent, "UCI Multiplexing on PUSCH for DL CoMP," 3GPP TSG RAN WG1 Meeting #69, R1-122491, May 2012.

International Search Report issued for International Application No. PCT/JP2013/001174 on May 14, 2013.

Khoshnevis, et al.; "Devices for Selecting a Channel State Information Report"; U.S. Appl. No. 13/550,465, filed Jul. 16, 2012.

Khoshnevis, et al.; "Collision Resolution Among Transmission Schedules of Uplink Control Information (UCI) Using Channel State Information (CSI) Process"; U.S. Appl. No. 13/853,931, filed Mar. 29, 2013.

Texas Instruments, "CSI Feedback to Support Downlink CoMP", 3GPP TSG RAN WG1, Meeting #68, R1-120463, Feb. 6-10, 2012, pp. 1-3.

3rd Generation Partnership Project; Technical Specification Group Radio Access Network; Evolved Universal Terrestrial Radio Access (E-UTRA); Physical Layer Procedures (Release 10), 3GPP TS 36.213, V10.4.0, Dec. 2011, 125 pages.

Ericsson et al., "Use of CSI-RS for CoMP Measurement Set Management", 3GPP TSG-RAN WG1 #68, R1-120786, Feb. 6, 2012, 3 pages.

* cited by examiner

COLLISION RESOLUTION AMONG TRANSMISSION SCHEDULES OF UPLINK CONTROL INFORMATION (UCI)

TECHNICAL FIELD

The present invention relates generally to wireless communications and wireless communications-related technology. More specifically, the present invention relates to systems and methods collision resolution among transmission schedules of uplink control information (UCI).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. Benefits may be realized by improved methods for reporting uplink control information (UCI) by a wireless communication device.

DETAILED DESCRIPTION

Figure 1:
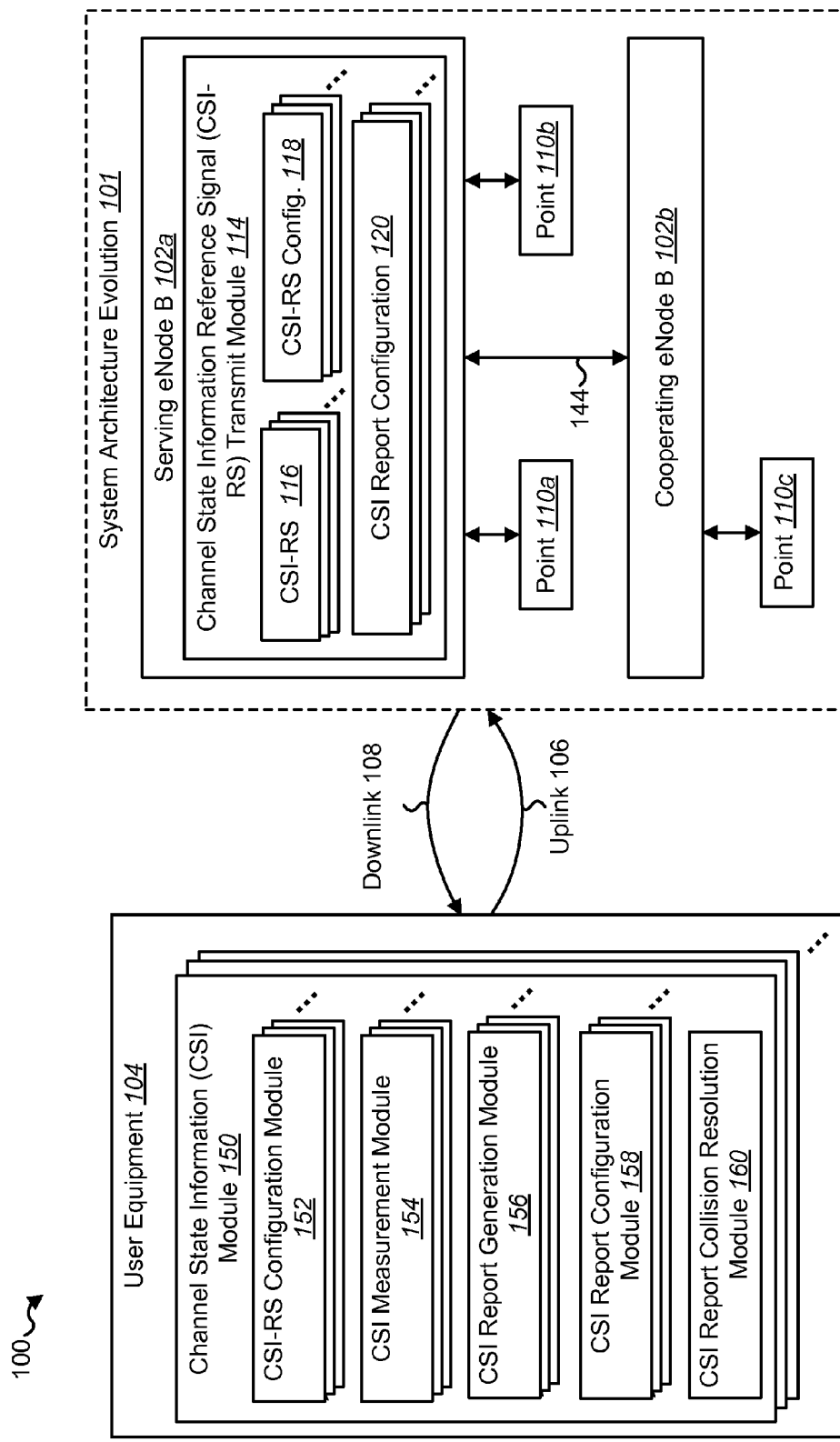
FIG. 1 is a block diagram illustrating a wireless communication system that may utilize coordinated multipoint (CoMP)

A method for reporting uplink control information (UCI) on a user equipment (UE) is described. Multiple channel state information (CSI) reports are generated for multiple CSI-RS received on a serving cell. The multiple CSI-RS reports are scheduled to be transmitted in a subframe. An overall highest priority CSI report is determined using a method of prioritization. The overall highest priority CSI report is selected. The overall highest priority CSI report is transmitted.

The selected method of prioritization may include assigning a higher priority to the CSI reports that support Rank Indication (RI) type. The selected method of prioritization may include prioritizing the CSI reports based on CSI report type.

The CSI report type may be a First-RS related report type with a first CSI-RS index, a Second-RS related report type with a second CSI-RS index, and/or an Aggregated-RS related report type. The CSI report may include an INTER-CSI-RS-PHASE and/or INTER-CSI-RS-AMPLITUDE.

The user equipment (UE) may be configured with a plurality of channel state information reference signals (CSI-RS) that are transmitted on the serving cell. Each of the plurality of CSI-RS may include a highest priority CSI report. Selecting the overall highest priority CSI report may include selecting the highest priority CSI report with the highest priority. Selecting the overall highest priority CSI report may include selecting the highest priority CSI report with a lowest serving cell index. Selecting the overall highest priority CSI report may include selecting the highest priority CSI report with a lowest configuration index. Selecting the overall highest priority CSI report may include selecting the highest priority CSI report with a lowest CSI-RS index.

The selected method of prioritization may include assigning a higher priority to the CSI reports that include wideband first precoding matrix indicator (PMI) types. The selected method of prioritization may include prioritizing the CSI reports based on sub-band CQI and based on wideband channel quality indicator (CQI), wideband PMI, INTER-CSI-RS-PHASE, and/or INTER-CSI-RS-AMPLITUDE.

The user equipment (UE) may transmit the overall highest priority CSI report to an eNode B on a Physical Uplink Control Channel (PUCCH).

The CSI report may include an aggregated Channel Quality Indicator, an aggregated Precoding Matrix Indicator, an aggregated Precoding Type Indicator, and/or an aggregated Rank Indicator. The multiple CSI reports may be generated using coordinated multipoint (CoMP) measurements.

A user equipment (UE) configured for reporting uplink control information (UCI) is also described. The user equipment (UE) includes a processor and memory in electronic communication with the processor. The user equipment (UE) generates multiple channel state information (CSI) reports for multiple CSI-RS transmitted on a serving cell. The multiple CSI reports are scheduled to be transmitted in a subframe. The user equipment (UE) determines an overall highest priority CSI report using a method of prioritization. The user equipment (UE) selects the overall highest priority CSI report for transmission. The user equipment (UE) transmits the overall highest priority CSI report.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9, Release-10 and Release-11). However, the scope of the present disclosure should not be limited in this regard. At least some aspects of the systems and methods disclosed herein may be utilized in other types of wireless communication systems.

In LTE Release-11, the use of coordinated multipoint (CoMP) transmission and reception are major enhancements. In coordinated multipoint (CoMP) transmission, a user equipment (UE) may be able to receive downlink signals from multiple geographically separated antennas (referred to herein as points). A point may be a set of geographically co-located antennas. A point may also be referred to as a site. Points may be located on or connected to the same base station or different base stations. Furthermore, uplink transmissions by the user equipment (UE) may be received by multiple points. Those points that transmit on the downlink to the user equipment (UE) may be referred to as transmission points. Those points that receive transmissions on the uplink from a user equipment (UE) may be referred to as reception points.

A point may be capable of both transmission and reception. In general, "point" refers to both transmission points and reception points. It is not necessary to use the same set of points for transmission to and reception from a given user equipment (UE). A subset of points participating in downlink transmission (to a user equipment (UE)) may be the same as or different from a subset of points participating in uplink reception (from the user equipment (UE)). Sectors of the same site may correspond to different points. A set of points that are involved in downlink transmission or uplink reception may change from one subframe to another.

An antenna port may be defined such that the channel over which a symbol on the antenna port is conveyed can be inferred from the channel over which another symbol on the same antenna port is conveyed. There may be one resource grid (time-frequency) per antenna port. Antenna ports can realize multiple layers for a multiple-input and multiple-output (MIMO) system. The points may be transparent to the user equipment (UE). To a user equipment (UE), antenna ports are distinguishable. An antenna port may be realized by an antenna or set of antennas in one point or a set of antennas in different points. However, points are distinguishable from the perspective of an eNode B. Therefore, in a transmission from a point to the user equipment (UE), from the perspective of the eNode B, the eNode B knows which point(s) are used for an antenna port participating in the transmission.

By coordinating the downlink transmissions from each point to the user equipment (UE), the downlink performance can be significantly increased. Likewise, by coordinating the uplink reception at multiple reception points, significant improvement in the uplink performance can be achieved. In coordinated multipoint (CoMP) transmissions, the channel state information (CSI) of each coordinated cell may be reported separately or jointly with the same format as Release-10 or new formats.

The use of coordinated multipoint (CoMP) transmission and/or reception may increase uplink and downlink data transmission rates while ensuring consistent service quality and throughput on LTE wireless broadband networks and 3G networks. Coordinated multipoint (CoMP) transmission and/or reception may be used on both the uplink and the downlink.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 that may utilize coordinated multipoint (CoMP). The wireless communication system 100 may include a serving eNode B 102a and a cooperating eNode B 102b as part of a system architecture evolution 101. The system architecture evolution 101 is a flat IP-based network architecture designed to replace the GPRS Core Network. In one configuration, the system architecture evolution 101 may be referred to as a core network.

The eNode B 102 may have a channel state information reference signal (CSI-RS) transmit module 114. The CSI-RS transmit module 114 may include channel state information reference signals (CSI-RS) 116, channel state information reference signal (CSI-RS) configurations 118 and channel state information (CSI) report configurations 120. The eNode B 102 may send the CSI-RS 116 to the user equipment (UE) 104, for instance, to be measured. Note, as used herein CSI-RS may refer to a single CSI-RS and/or multiple CSI-RSs.

The CSI-RS transmit module 114 may generate CSI-RS configurations 118. The eNode B 102 may then send the CSI-RS configuration 118 to the user equipment (UE) 104. In this way, the user equipment (UE) 104 may use the received CSI-RS configurations 118 to detect and process the CSI-RS 116 transmitted to it. For example, the user equipment (UE) 104 may store the received CSI-RS configurations 118 in the CSI-RS configuration module 152.

The eNode B 102 may send the channel state information (CSI) report configurations 120 to the user equipment (UE) 104 so that the user equipment (UE) 104 may generate CSI reports to be sent back to the eNode B 102. For example, each channel state information (CSI) report configuration 120 may also include information about which CSI-RS(s) 116 should be used to be reported. For example, the user equipment (UE) 104 may store the received CSI report configurations 120 in the CSI report configuration module 158.

An eNode B 102 is a physical structure that may include multiple antennas. Some of the antennas may be co-located with an eNode B 102 and other antenna ports may be geographically separated from an eNode B 102. Both the co-located antennas and the geographically separated antennas may be referred to as points 110. Some of the points 110a-b may be associated with the serving eNode B 102a while other points 110c may be associated with a cooperating eNode B 102b. The eNode Bs 102 may use the points 110 to coordinate downlink 108 transmission to and uplink 106 reception from a user equipment (UE) 104. If a point 110c is connected to a cooperating eNode B 102b, there may be a backhaul interface 144 connecting the cooperating eNode B 102b to the serving eNode B 102a.

A point 110 may be an antenna and or antenna port associated with a base station. A base station may be referred to as an access point, a transmission point, a Node B, an eNode B, a transmission node, a node or some other terminology. A point 110 may be collocated with a base station or geographically separated from the base station. Likewise, a user equipment (UE) 104 may be referred to as a mobile station, a subscriber station, an access terminal, a remote station, a user terminal, a terminal, a handset, a subscriber unit, a wireless communication device or some other terminology.

Communication between a user equipment (UE) 104 and an eNode B 102 may be accomplished using transmissions over a wireless link, including an uplink 106 and a downlink 108. The uplink 106 refers to communications sent from a user equipment (UE) 104 to a device in the system architecture evolution 101 (e.g., an eNode B 102). The downlink 108 refers to communications sent from the system architecture evolution 101 (e.g., an eNode B 102) to a user equipment (UE) 104. An eNode B 102 may use different combinations of points 110 to send downlink 108 signals to a user equipment (UE) 104 and receive uplink 106 signals from the user equipment (UE) 104.

In general, the communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, a base station may have multiple antennas (or points 110) and a user equipment (UE) 104 may have multiple antennas (not shown). In this way, a base station and a user equipment (UE) 104 may each operate as either a transmitter or a receiver in a MIMO system. One benefit of a MIMO system is improved performance if the additional dimensionalities created by the multiple transmit and receive antenna ports realized by the multiple transmit and receive antennas are utilized.

In 3rd Generation Partnership Project (3GPP) Long Term Evolution (LTE)-Advanced, additional control feedback may be sent on control channels to accommodate MIMO and carrier aggregation. Carrier aggregation refers to transmitting data on multiple component carriers (CCs) (or cells) that are contiguously or separately located.

The downlink 108 transmission from multiple points 110 to a single user equipment (UE) 104 may be referred to as coordinated multipoint (CoMP) transmission operation. The uplink 106 transmission from a user equipment (UE) 104 to multiple reception points 110 may be referred to as coordinated multipoint (CoMP) reception operation.

In CoMP, one transmission method is joint transmission (JT) as stated by 3GPP Release-10 specification. In one configuration of JT, all participating transmission points (TPs) 110 transmit the same unencoded data. In another configuration, all the TPs 110 may transmit the same coded data and the user equipment (UE) 104 receives and combines the signals at the user equipment (UE) 104. For example, the received signals may be combined or superimposed on the user equipment (104) prior to any processing being performed by the user equipment (UE) 104.

All points 110 transmitting coordinated multipoint (CoMP) signals to a user equipment (UE) 104 may be referred to as CoMP transmission points (TPs) 110 or transmission points (TPs) 110. All points 110 receiving coordinated multipoint (CoMP) signals from a user equipment (UE) 104 may be referred to as CoMP reception points 110 or reception points 110. The point 110 may transmit a reference signal over the downlink 108 to the user equipment (UE) 104. Each of the points 110 may use a channel state information reference signal (CSI-RS) transmit module 114 to transmit the reference signal to the user equipment (UE) 104.

Different types of reference signals may be used by the points 110. For example, points 110 may use cell-specific reference signals (CRS), multimedia broadcast over a single frequency network (MBSFN) reference signals, UE-specific reference signals (e.g., a demodulation reference signal (DM-RS)), positioning reference signals (PRS) and channel state information reference signals channel state information reference signal (CSI-RS). In Release-10 of 3GPP, there is one reference signal transmitted per downlink 108 antenna port.

The frequency bandwidth may be partitioned in subcarriers with equal bandwidth. The set of subcarriers may be denoted by $SC=\{sc_1, sc_2, \ldots, sc_k\}$. Time may be divided into intervals with equal durations known as the symbol period. In 3GPP Release-8 and later releases, the temporal duration of a time-frequency resource grid is 10 milliseconds (ms) (referred to as one radio frame). One radio frame may include 10 subframes, each with a duration of 1 ms, which is the duration of transmission in the uplink 106 and/or downlink 108. Every subframe may be divided into two slots, each with a duration of 0.5 ms. The set of time intervals may be denoted by $T=\{T_1, T_2, \ldots, T_L\}$. The frequency-time resource grid may then be defined as the Cartesian product of $SC \times T = \{(sc_k, T_l), k=1, \ldots, K \text{ and } l=1, \ldots, L\}$.

The minimum amount of resource that can be allocated for the transmission of information in the uplink 106 or downlink 108 in any given subframe is two resource blocks (RBs), with one RB at each slot. Each slot may be divided into 7 symbols. The frequency domain may be divided into bands with a 15 kilohertz (kHz) width, referred to as a subcarrier. In other words, one RB has a duration of 0.5 ms (7 symbols or one slot) in the time domain and a bandwidth of 12 subcarriers (180 kHz) in the frequency domain. One resource element has a duration of one symbol in the time domain and the bandwidth of one subcarrier in the frequency domain. Additionally, at any given subframe, a maximum of two RBs (one RB at each slot) can be used by a given user equipment (UE) 104 for the transmission of uplink control information (UCI) in the physical uplink control channel (PUCCH).

The points 110 participating in the transmission of reference signals to the user equipment (UE) 104 may belong to the coordinated multipoint (CoMP) measurement set. The coordinated multipoint (CoMP) measurement set may be defined as the set of points 110 about which channel state/statistical information related to their link to the user equipment (UE) 104 is measured and/or reported. The transmission of reference signals in the downlink 108 may or may not occur in a coordinated multipoint (CoMP) transmission setting.

As used herein, a cooperating set refers to a set of geographically and/or virtually separated points 110 directly and/or indirectly participating in data transmission to a user equipment (UE) 104 in a time-frequency resource and/or data reception from a user equipment (UE) 104 in a time-frequency resource. The set of transmission and/or reception points 110 is a subset of the cooperating set. The cooperating set may or may not be transparent to the user equipment (UE) 104.

The user equipment (UE) 104 may include one or more channel state information (CSI) modules 150. For example, each component carrier (CC) may have a channel state information (CSI) module 150.

The channel state information (CSI) module 150 may include one or more channel state information (CSI) configuration modules 152, one or more channel state information (CSI) measurement modules 154, one or more channel state information (CSI) report generation modules 156, one or more channel state information (CSI) report configuration modules 158 and a channel state information (CSI) report collision resolution modules 160.

The channel state information (CSI) configuration module 152 may receive a CSI-RS configuration from eNode B 102. The CSI-RS configuration includes CSI-RS sequence, periodicity, antenna port from which the CSI-RS is transmitted and the pattern of resource elements occupied by the CSI-RS symbols. A configured CSI-RS with a particular configuration is referred to as CSI-RS resource. The reference signal sequence of a configured CSI-RS resource is transmitted on a carrier, or component carrier, occupying the time and frequency resources determined by the CSI-RS configuration.

The CSI-RS configuration may inform the user equipment (UE) 104 about the configuration of the CSI-RS received at the user equipment (UE) 104. For example, if there were multiple eNode Bs 102 using the same component carrier (CC) or cell, as may be the case with coordinated multipoint (CoMP) measurement, then each channel state information (CSI) configuration module 152 may receive a CSI-RS configuration and may apply the CSI-RS configuration to the received CSI-RS signal. In other words, multiple CSI-RS may be configured. The CSI-RS configuration may be performed by radio resource control (RRC) signaling. In general, the serving eNode B 102 configures the user equipment (UE) 104 with one or more CSI-RS in a given carrier component. The association of CSI-RS to other eNode Bs and/or other transmission points might be transparent to the user equipment (UE) 104. One parameter that is used for configuring CSI-RS resources is the identification number associated to a cell, known as the cell-ID. All the configured CSI-RS may or may not belong to the same serving cell. In other words, one or more CSI-RS resources may be configured with cell-ID(s) different from the user equipment's (user equipment (UE)'s) serving cell cell-ID. In one configuration, CSI-RS are indexed. The CSI-RS index may be used for prioritization.

As another example, the channel state information (CSI) module 150 may have two channel state information (CSI) configuration modules 152 that each include a CSI-RS configuration (e.g., CSI-RS 1 configuration and CSI-RS 2 configuration).

The channel state information (CSI) measurement module 154 may measure the channel state information (CSI) for each configured CSI-RS. For example, CSI-RS1 may be transmitted according to the periodicity and resource elements pattern as indicated by CSI-RS 1 configuration. In other words, at the proper time, channel state information (CSI) measurement module 154 may measure the channel state information (CSI) based on the received symbols on the resource elements on which the CSI-RS1 is transmitted. In this way, the user equipment (UE) 104 may obtain a channel state information (CSI) measurement for each CSI-RS. Additionally, the user equipment (UE) 104 may be able to obtain multiple CSI measurements when multiple CSI-RS are configured. The CSI report configuration may identify which CSI-RS(s) should be measured and/or reported In Release 10 radio resource control (RRC) specification, the CSI report configuration is referred to as CQIReportConfig.

The channel state information (CSI) report generation module 156 may generate channel state information (CSI) reports. The channel state information (CSI) reports may be generated according to a channel state information (CSI) report configuration, which is set by the channel state information (CSI) report configuration module 158. The channel state information (CSI) reports may be sent back to the eNode B 102 having one or more transmission points 110. Thus, in the case of coordinated multipoint (CoMP) transmissions multiple channel state information (CSI) reports may need to be generated and sent back to the serving eNode B 102 (or central scheduler). For each serving cell or each component carrier, there may be one or more channel state information (CSI) report generation modules 156. The channel state information (CSI) report generation modules 156 may be derived by a CSI report configuration, which may be set by the CSI report configuration module 158. One channel state information (CSI) report generation module 156 may correspond to the one or more CSI-RS(s) depending on CSI report configuration. The CSI report configuration, set by the CSI report configuration module 158, may identify which CSI-RS(s) should correspond to the channel state information (CSI) report generation module 156. For example, if there are two CSI Report configurations, for the same carrier (or component carrier, or carrier frequency) or for the same serving cell, then there will be at least two channel state information (CSI) report generation modules 156. One channel state information (CSI) report generation module 156 will correspond with CSI Report Configuration 1. Another channel state information (CSI) report generation module 156 will correspond with CSI Report Configuration 2.

The CSI report generation module 156 may generate CSI reports from CSI measurements performed by the CSI measurement module 154. The CSI reports may be based on the CSI report configuration, which may be set by the CSI report configuration module 158. It should be noted the channel state information (CSI) report may be based on a variety of channel state information (CSI) measurements. For example, the channel state information (CSI) report configuration may be based on channel quality indicators (Cal). In other words, The CSI report may be a CQI report.

Each channel state information (CSI) report configuration may include information about what should be reported and when it should be reported. For example, the channel state information (CSI) report configuration may set the periodicity for reporting a channel quality indication (CQI) and a precoding matrix indication (PMI) as well as the periodicity for reporting the rank indication (RI). For instance, the channel state information (CSI) report configuration may indicates that channel quality indications (CQI) should be reported every 5 milliseconds (ms) and rank indications (RI) should be reported every 20 milliseconds (ms). Each channel state information (CSI) report configuration may also include information about which CSI-RS(s) should be reported.

The channel state information (CSI) report generation module 156 may generate reports based on channel state information (CSI) measurement. Each generated report is identified by a report type (also referred as to PUCCH reporting type, PUCCH CSI reporting type, CSI reporting type, etc.). A report type indicates a specific combination of channel state information (CSI) information to be reported. For example, one type, denoted by TypeA, may include wideband CQI and PMI and another type, denoted by TypeB, may include RI. At a given time, the channel state information (CSI) report configuration determines what should be reported. Because different measurements (such as CQI, PMI and RI) may have different periodicities, two or more types may be chosen to be reported at the same time slot. This may cause a collision among the transmission schedule of multiple CSI reports. For example, if the channel state information (CSI) report configuration indicates that channel quality indications (CQI) should be reported every 5 milliseconds (ms) and rank indications (RI) should be reported every 20 milliseconds (ms), there will be a collision every 20 milliseconds (ms) both indications are being reported.

In 3GPP Release-10 specifications, the user equipment (UE) 104 is configured with only one CSI-RS with non-zero power for estimating the channel state information of a given component carrier and has only one channel state information (CSI) report generation module 156 corresponding to the configured CSI-RS. In 3GPP Release-11 specification and future releases of 3GPP specifications there might be more than one CSI-RS configuration and CSI-RS resource received by the user equipment (UE) 104 in any given component carrier. Thus, it may be beneficial to employ multiple channel state information (CSI) report generation modules 156 for each serving cell.

In addition, in 3GPP Release-11 specification and future releases of 3GPP specifications, coordinated multipoint (CoMP) operation may introduce more than one CSI-RS configuration. In other words, there may be multiple measurements, one for each CSI-RS and possibly an aggregated measurement, measuring the channel state information (CSI) of the effective channel obtained by combining all or a subset of the channels estimated by the configured CSI-RSs. Depending on the situation, there might be one or more channel state information (CSI) reports that are scheduled to be reported and/or transmitted at a given subframe. The colliding channel state information (CSI) reports might belong to the same measurement corresponding to a single CSI-RS, to different CSI-RSs or to aggregated measurement (e.g., a channel state information measurement performed on combination of the estimated channels by different CSI-RSs, or the CSI measurement of a CSI-RS that is transmitted from multiple points). Thus, various systems and methods relating to collision resolution will be described herein.

The channel state information (CSI) report collision resolution module 160 may resolve collision between channel state information (CSI) reports in the same serving cell. Note that the serving cell in this content (CoMP CSI measurement) is referring to a component carrier. In particular, in one implementation of CoMP, CSI-RS1 may be transmitted on the component carrier 1 from the user equipment's (UE) serving cell and CSI-RS2 may be transmitted on the same component carrier 1 from the user equipment's (UE) neighboring cell, which has a different cell-ID. Note that as long as the user equipment (UE) 104 is not aware of the association between CSI-RS and the cell, the measurement and reporting could be agnostic and transparent to such association. The output of the channel state information (CSI) report collision resolution module 160 may be a single channel state information (CSI) report to be fed back. The channel state information (CSI) report collision resolution module 160 may resolve collision based on various prioritizations, such as reporting-type, reporting-configuration and/or the serving cell index. The channel state information (CSI) report collision resolution module 160 may also resolve collisions between channel state information (CSI) reports from different serving cells, or different component carriers. In this way, collisions may be resolved within each serving cell and among multiple serving cells within the user equipment (UE) 104.

Figure 2:
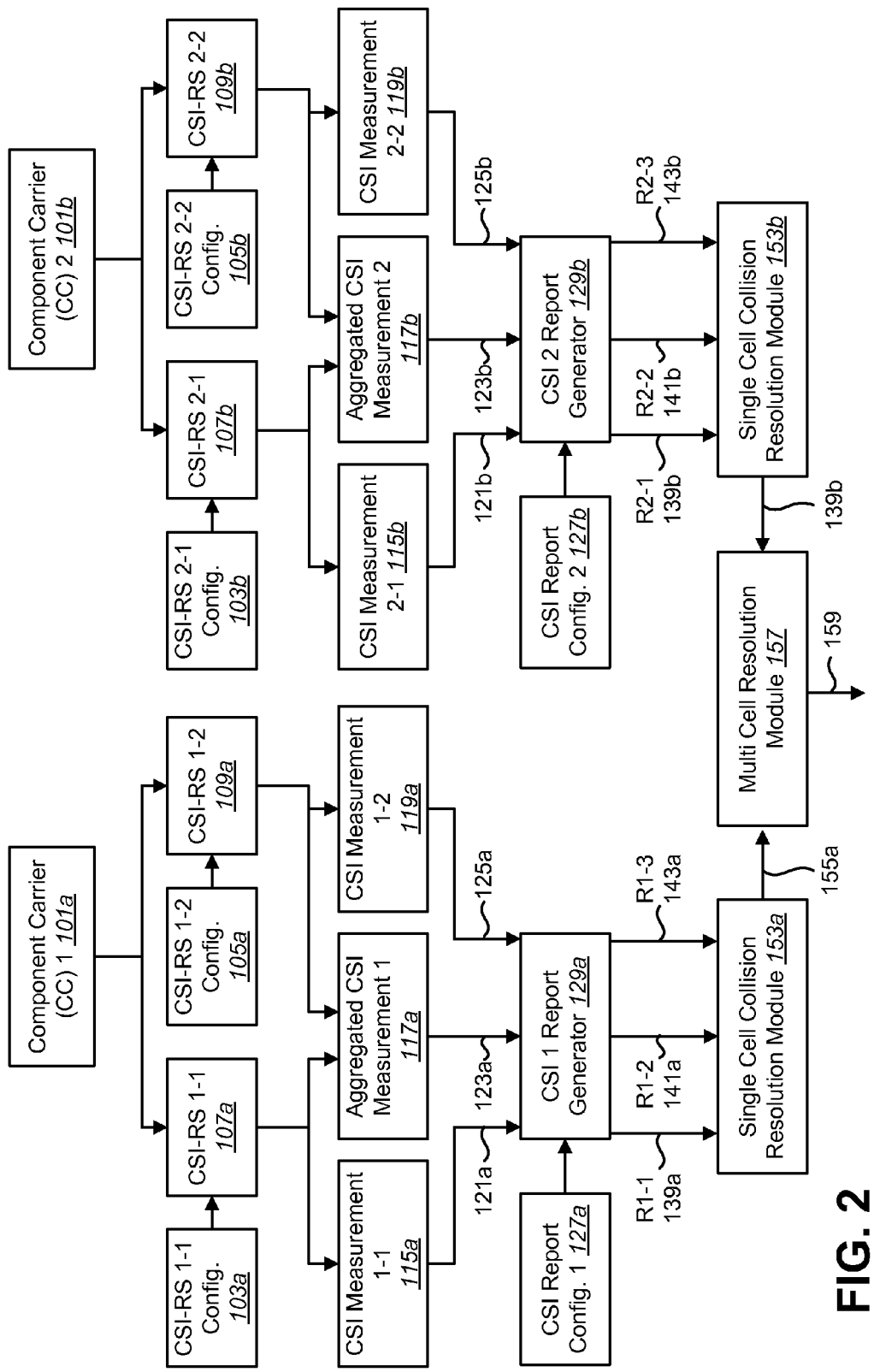
FIG. 2 is a block diagram illustrating one configuration of CSI-RS resources, measurements and reporting in a user equipment (UE) serving cell.

FIG. 2 is a block diagram illustrating one configuration of CSI-RS resources, measurements and reporting in a user equipment (UE) 104 serving cell. There may be one or more corresponding component carriers (CC) 101 (or serving cells). For example, component carrier 1 101a and component carrier 2 110 may each represent a serving cell. For the sake of simplicity, the following description with respect to component carrier 1 (or serving cell) 101a may be applied to component carrier 2 (or serving cell) 101b, respectively.

The user equipment (UE) 104 may include a CSI-RS 1-1 107a and a CSI-RS 1-2 109a, which are configured by a CSI-RS configuration 1-1 103a and a CSI-RS configuration 1-2 105a, respectively. The CSI-RS configuration 103a and 105a of FIG. 2 may be examples of the CSI-RS configuration module 152 discussed in connection with FIG. 1. The user equipment (UE) 104 may include a CSI measurement 1-1 115a, a CSI measurement 1-2 119a and an aggregate channel state information (CSI) measurement 1 117a. The CSI measurements modules 115a, 117a and 119a of FIG. 2 may be examples of the CSI-RS measurement module 154 discussed in connection with FIG. 1. The user equipment (UE) 104 may include a channel state information (CSI) report generator 129a and a corresponding CSI report configuration 1 127a. The channel state information (CSI) report generator 1 129a of FIG. 2 may be part of the CSI report generation module 156 discussed in connection with FIG. 1. The channel state information (CSI) report configuration 1 127a of FIG. 2 may be part of the CSI report configuration module 158 discussed in connection with FIG. 1. The user equipment (UE) 104 may include a single cell collision resolution module 153a and a multi cell resolution module 157. The single cell collision resolution module 153a and/or a multi cell resolution module 157 may be part of the CSI report collision resolution module 160 discussed in connection with FIG. 1.

The user equipment (UE) 104 may receive a signal on a component carrier (CC) 1 (or serving cell) 101a. The signal may be a channel state information reference signal (channel state information reference signal (CSI-RS)). If the component carrier (CC) 1 101a is employing coordinated multipoint (CoMP) transmissions, then multiple CSI-RS may be received, where each CSI-RI may belong to the UE's serving cell or a neighboring cell. For example, CSI-RS 1-1 107a and CSI-RS 1-2 109a may be received. For simplicity, CSI-RS 1-X refers to the Xth configured CSI-RS for component carrier (CC) 1 101a. Thus, CSI-RS 2-2 109b refers to the second configured CSI-RS for component carrier 2 101b.

Each CSI-RS (e.g., CSI-RS 1-1 107a and CSI-RS 1-2 109a) may correspond with a CSI-RS configuration (CSI-RS configuration 1-1 103a and CSI-RS configuration 1-2 105a, respectively). The CSI-RS configuration may include CSI-RS sequence, periodicity, antenna port from which the CSI-RS is transmitted and the pattern of resource elements occupied by the CSI-RS symbols and may be set by the eNode B 102. The CSI-RS configuration may inform the user equipment (UE) 104 about the configuration of the received CSI-RS (e.g., CSI-RS 1-1 107a and CSI-RS 1-2 109a). For example, CSI-RS 1-1 107a may be transmitted by the eNode B 102 according to the periodicity and resource elements pattern as indicated by CSI-RS 1-1 Additionally, if multiple eNode Bs 102 or multiple cells, including one serving cell and one or more neighboring cells, use the same component carrier (CC) 101a, then for each configured CSI-RS (e.g., CSI-RS 1-1 107*a* and CSI-RS 1-2 109*a*) the user equipment (UE) 104 may receive a CSI-RS configuration (e.g., CSI-RS configuration 1-1 103*a* and CSI-RS configuration 1-2 105*a*) via RRC signaling from the eNode B 102 and may apply the CSI-RS configuration (e.g., CSI-RS configuration 1-1 103*a* and CSI-RS configuration 1-2 105*a*) to the received signal (e.g., CSI-RS 1-1 107*a* and CSI-RS 1-2 109*a*) in order to perform the channel state information measurement, synchronization and/or demodulation.

In one configuration, each channel state information reference signal (CSI-RS) 1-1 107*a*, 1-2 109*a* may have each have their own dedicated channel state information (CSI) report configuration. This will be described below in FIG. 4. In another configuration, each CSI reference signals (CSI-RS) 1-1 107*a*, 1-2 109*a* may share a single channel state information (CSI) report configuration 1 127*a*.

The user equipment (UE) 104 may measure the channel state information (CSI) for each CSI-RS (e.g., CSI-RS 1-1 107*a* and CSI-RS 1-2 109*a*) transmitted in each component carrier 101*a*. Thus, CSI-RS 1-1 107*a* and CSI-RS 1-2 109*a* may be measured to obtain CSI measurement 1-1 115*a* and CSI measurement 1-2 119*a*. Aggregate channel state information (CSI) measurement 1 117*a* may also be obtained by measuring the channel state information of an aggregated channel. To measure the aggregated channel, the user equipment (UE) 104 may assume a combined channel, which is calculated by superposition (e.g., addition) of the received signals from multiple configured CSI-RSs at the user equipment (UE) 104. The aggregated channel may be derived by a superposition of all, or a subset, of the configured CSI-RSs. The aggregated channel state information may be measured by the multiple CSI-RSs while the user equipment (UE) 104 assumes there is the aggregated channel. Note that the aggregate CSI measurement 1 117*a* may be obtained independent of CSI-RS 1-1 107*a* and CSI-RS 1-2 109*a* by allocating a CSI-RS dedicated for measuring the aggregated channel state information (CSI). This may require a separate CSI-RS configuration dedicated for the aggregated CSI measurement 1 117*a*. Each channel state information (CSI) measurement may send channel state information (CSI) such as channel quality indicators (CQI), a precoding matrix indicators (PMI), precoding type indicators (PTI), rank indicators (RI), etc. The CSI measurement 1-1 115*a*, aggregate CSI measurement 117*a* and CSI measurement 1-2 119*a* may send channel state information (CSI), 121*a*, 123*a* and 125*a*, respectively, to a channel state information (CSI) report generator 129*a*.

The channel state information (CSI) report generator 129*a* may generate channel state information (CSI) reports. Channel state information (CSI) reports may be in Rx-y-z format, where x is serving cell index, y is CSI report configuration index and z is report index. Thus, z may describe the number of the reports generated at a subframe. For example, R1-1-3 refers to the third report generated corresponding to the first CSI-RS of the first serving cell.

In the case of only a single channel state information (CSI) report configuration 127 and channel state information (CSI) report generator 129, channel state information (CSI) reports may be made in Rx-z format. For example, channel state information (CSI) report generator 129*a* may generate three channel state information (CSI) reports, R1-1 139*a*, R1-2 141*a* and R1-3 143*a*, corresponding to CSI measurement 1-1 115*a*, aggregate CSI measurement 117*a* and CSI measurement 1-2 119*a* may send channel state information (CSI), respectively.

The channel state information (CSI) report generator 129*a* may obtain directions from CSI report configuration 1 127*a*. CSI report configuration 1 127*a* may be set by the eNode B 102. In some configurations, the CSI report configuration 1 127 may be a CQI report configuration.

FIG. 2 illustrates, in each component carrier, two CSI-RS (e.g., 107 and 109), three CSI measurement modules (e.g., 115, 117 and 119) and one CSI report generator 129 with a corresponding CSI report configuration 127. However, where K represents any positive integer, there may be K CSI-RS, K+n measurement modules (where the +n represents the number of the aggregated CSI measurement module) and 1, K, or K+n CSI report configurations and CSI report generators. Further, each CSI report generator may have a corresponding report configuration and the number of CSI report generators may be 1, K or K+n and need not to be K.

Within component carrier (CC) 1 or serving cell 101*a*, the user equipment (UE) 104 may resolve collisions from the multiple channel state information (CSI) Reports R1-1 139*a*, R1-2 141*a* and R1-3 143*a* at a single cell collision resolution module 153*a*. The single cell collision resolution module 153*a* may resolve collisions by using priorities based on report-type and/or report-configuration. For example, if the single cell collision resolution module 153*a* is using report-configuration, the single cell collision resolution module 153*a* may give a channel state information (CSI) reports with a lower CSI report configuration index (e.g., z) higher priority of a channel state information (CSI) report with a higher CSI report configuration index, or vise-versa.

If the user equipment (UE) 104 is configured with multiple component carriers (CC) 101 (e.g., component carrier 1 (CC) 101*a* and component carrier 2 (CC) 101*b*), the user equipment (UE) 104 may resolve multi-component carrier collisions with a multi cell resolution module 157. The multi cell resolution module 157 may receive the highest channel state information (CSI) reports 155*a* and 155*b* for each component carriers (CC) 101 and determine the channel state information (CSI) report with the highest priority 159. The channel state information (CSI) report with the highest priority 159 may then be transmitted to the eNode B 102. In some cases, multi cell resolution module 157 may determine priority based on which serving cell or component carriers (CC) 101 has the lowest serving cell index. For example, if the channel state information (CSI) reports 155*a* and 155*b* from component carrier 1 (CC) 101*a* and component carrier 2 101*b* had the same priority, then the multi cell resolution module 157 would determine the channel state information (CSI) report 155*a* from component carrier 1(CC) 101*a* to be the highest priority 159 channel state information (CSI) report because component carrier 1 101*a* has a lower serving cell index (i.e., 1) than the serving cell index (i.e., 2) of component carrier 2 101*b*. The priority order of cell index and/or the report-configuration may be set a priori or may be configured by eNode B via radio resource control (RRC) signaling.

Figure 3:
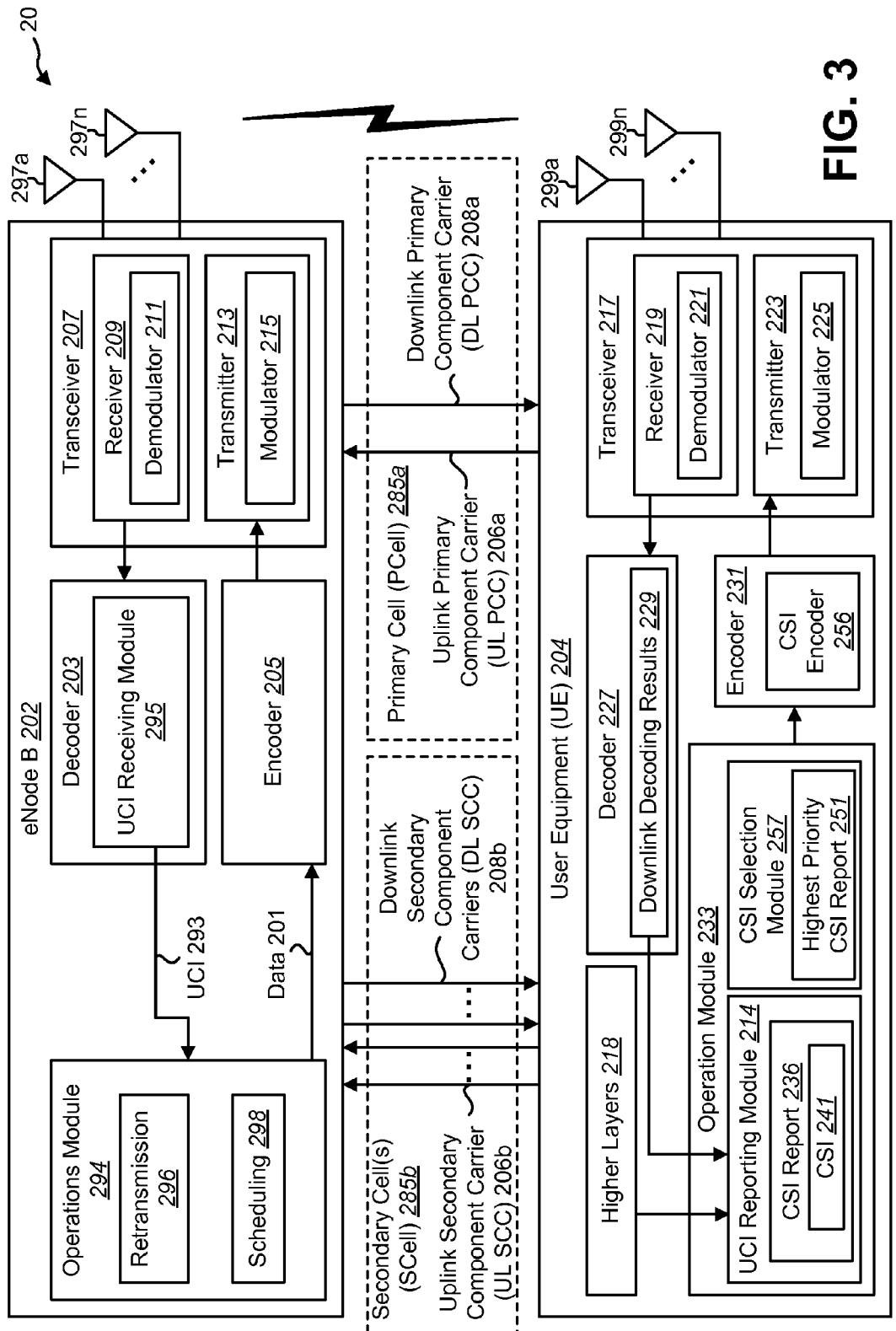
FIG. 3 is a block diagram illustrating a wireless communication system using uplink control information (UCI) multiplexing.

FIG. 3 is a block diagram illustrating a wireless communication system 200 using uplink control information (UCI) multiplexing. An eNode B 202 may be in wireless communication with one or more user equipments (UEs) 204. The eNode B 202 may be an example of the eNode B 102 described in connection with FIG. 1. The eNode B 202 may be part of a coordinated multipoint (CoMP) system. For instance, the eNode B 202 may be a serving eNode B 102*a* or a cooperating eNode B 102*b*.

The user equipment (UE) 204 may be an example of the user equipment (UE) 104 described in connection with FIG.

1. For example, the user equipment (UE) 204 may include an uplink channel information (UCI) reporting module 214. The UCI reporting module 214 may include a CSI report 236 and channel state information (CSI) 241. The UCI reporting module 214 of FIG. 3 may be one example of and/or include the CSI module 150 of FIG. 1. For example, the CSI report generation module 156 of FIG. 1 may generate the CSI report 236 of FIG. 3.

The user equipment (UE) 204 communicates with an eNode B 202 using one or more antenna ports, which may be realized by one or more physical antennas 299a-n. The user equipment (UE) 204 may include a transceiver 217, a decoder 227, an encoder 231 and an operations module 233. The transceiver 217 may include a receiver 219 and a transmitter 223. The receiver 219 may receive signals from the eNode B 202 using one or more antenna ports, which may be realized by one or more physical antennas 299a-n. For example, the receiver 219 may receive and demodulate received signals using a demodulator 221. The transmitter 223 may transmit signals to the eNode B 202 using one or more antenna ports, which may be realized by one or more physical antennas 299a-n. For example, the transmitter 223 may modulate signals using a modulator 225 and transmit the modulated signals.

The receiver 219 may provide a demodulated signal to the decoder 227. The user equipment (UE) 204 may use the decoder 227 to decode signals and make downlink decoding results 229. The downlink decoding results 229 may indicate whether data was received correctly. For example, the downlink decoding results 229 may indicate whether a packet was correctly or erroneously received (i.e., positive acknowledgement, negative acknowledgement or discontinuous transmission (no signal)). In one configuration, the receiver 219 may receive one or more coordinated multi-point (CoMP) transmitting signals. For example, the user equipment (UE) 204 may include multiple component carrier 101 and each component carrier 101 may receive signals from one or more transmission points 110 and the cells associated to the component carrier 101 from different transmission points may represent a single serving cell, having the same cell-ID, or they may have different cell-ID in which one cell is referred to as serving cell and other cells are referred to as neighboring cell. Also note that in case that there are one serving cell and one or more neighboring cell, all cells may be process in a single eNode B 102 or in more than one eNode B 102a-b.

The operations module 233 may be a software and/or hardware module used to control user equipment (UE) 204 communications. For example, the operations module 233 may determine when the user equipment (UE) 204 requires resources to communicate with the eNode B 202.

The user equipment (UE) 204 may transmit uplink control information (UCI) to an eNode B 202 on the uplink. The uplink control information (UCI) may be channel state information (CSI) 241 and may include a channel quality indicator (CQI), a precoding matrix indicator (PMI), precoding type indication (PTI), rank indication (RI), a scheduling request (SR), etc.

The channel quality indicator (CQI) may indicate a combination of modulation scheme and coding rate. The precoding matrix indicator (PMI) indicates the codebook for precoding the MIMO transmission. The precoding type indication (PTI) indicates the precoding type. The rank indication (RI) indicates the number of useful transmission layers for the MIMO transmission. There are different types of channel quality indicator (CQI) feedback. For periodic reporting, there is wideband feedback (WB-CQI) and UE-selected subband feedback (UE-CQI). In wideband feedback (WB-CQI), the user equipment (UE) 204 may report one wideband channel quality indicator (CQI) value for the whole system bandwidth. In UE-selected subband feedback (UE-CQI), the user equipment (UE) may report the channel quality indicator (CQI) for some subbands instead of the whole system bandwidth. The system bandwidth may be divided into J bandwidth parts, as illustrated in Table 1.

TABLE 1

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

In one configuration, the channel state information (CSI) 241 (e.g., CQI/PMI/PTI/RI) may be separately coded. In another configuration, the channel state information (CSI) 241 may be jointly coded. Herein, CQI/PMI/PTI/RI refers to CQI and/or PMI and/or PTI and/or RI. The CQI and/or PMI and/or PTI and/or RI may be reported together or independently based on the physical uplink control channel (PUCCH) reporting modes. The CQI/PMI/PTI/RI may be collectively referred to as channel state information (CSI) 241. A channel state information (CSI) report thus may include a CQI/PMI/PTI/RI report.

Channel state information (CSI) 241 reporting from a user equipment (UE) 204 to an eNode B 202 may be periodic or aperiodic. Aperiodic channel state information (CSI) reports may be requested by an eNode B 202. Periodic channel state information (CSI) reports may be configured by an eNode B 202, so that the user equipment (UE) 204 reports channel state information (CSI) 241 to the eNode B 202 at pre-specified subframes.

The channel state information (CSI) report 236 may be generated by the uplink control information (UCI) reporting module 214 and transferred to a channel state information (CSI) encoder 256 that is part of the encoder 231. The channel state information (CSI) encoder 256 may generate uplink control information (UCI) using backwards-compatible physical uplink control channel (PUCCH) formats. Backwards-compatible physical uplink control channel (PUCCH) formats are those formats that may be used by Release-10 user equipments (UEs) 204 as well as Release-8/9 user equipments (UEs) 204.

The channel state information (CSI) report 236 may also include the number of antenna ports. For example, a channel state information (CSI) report 236 may correspond to eight antenna ports, four antenna ports or two antenna ports. A channel state information (CSI) report 236 may further include the corresponding component carrier (CC) 208 (or cell 285) of the channel state information (CSI) report 236. This may allow the channel state information (CSI) selection module 257 to prioritize channel state information (CSI) reports 236 using radio resource control (RRC) based prioritization that is signaled by higher layers 218. Radio resource control (RRC) based prioritization refers to a predefined component carrier (CC) 208 prioritization rule that specifies the priority ordering of component carriers (CCs) 208 (e.g., CC1>CC2>CC3).

A channel state information (CSI) report 236 may further include a priority number. For each reporting format, a priority number may be defined. In increasing order, the priority goes lower (i.e., a lower priority number has a higher priority). The priority numbers may be defined according to the reporting mode, the feedback reporting type (also referred as to PUCCH reporting type, PUCCH CSI reporting type, CSI reporting type etc.), the number of antenna ports and the rank indication (RI).

The channel state information (CSI) encoder 256 may include a channel state information (CSI) selection module 257. In Release-8, a user equipment (UE) 204 does not simultaneously transmit on the physical uplink control channel (PUCCH) and the physical uplink shared channel (PUSCH). Only one channel state information (CSI) report 236 may be transmitted on the physical uplink control channel (PUCCH). Thus, the channel state information (CSI) selection module 257 may be used to determine which channel state information (CSI) report 236 should be transmitted on the physical uplink control channel (PUCCH).

The channel state information (CSI) selection module 257 may receive multiple channel state information (CSI) reports 236. The channel state information (CSI) selection module 257 may then determine a highest priority channel state information (CSI) report 251 from among the multiple channel state information (CSI) reports 236. The channel state information (CSI) selection module 257 may use one or more of the feedback reporting mode also referred as to PUCCH reporting mode, PUCCH CSI reporting mode, PUCCH CSI reporting mode, CSI reporting mode etc.), the feedback reporting type (also referred as to PUCCH reporting type, PUCCH CSI reporting type, CSI reporting type, etc.), the number of antenna ports, the corresponding component carrier (CC) 208 (or cell 285) of the channel state information (CSI) report 236 and/or the priority number to determine the highest priority channel state information (CSI) report 251. For example, the channel state information (CSI) selection module 257 may prioritize the channel state information (CSI) reports 236 based on the feedback reporting mode followed by the feedback reporting type. The channel state information (CSI) reports 236 received by the channel state information (CSI) selection module 257 that are not selected as the highest priority channel state information (CSI) report 251 may then be dropped by the channel state information (CSI) selection module 257.

One resource of the physical uplink control channel (PUCCH) may be allocated for transmission of the uplink control information (UCI), with collision resolution procedures resolving any collision issues. In case of a collision in the scheduling of the transmission of channel state information (CSI) 241, a collision resolution procedure may be used to determine the resource and format used for transmission.

The physical uplink control channel (PUCCH) for channel state information (CSI) 241 may be semi-statically scheduled by an eNode B 202, but the physical uplink control channel (PUCCH) may be dynamically allocated based on downlink configurations and transmission. The uplink control information (UCI) may be transmitted using the physical uplink control channel (PUCCH).

In Long Term Evolution (LTE) Release-8, only one uplink component carrier (CC) 206 or cell 285 and one downlink component carrier (CC) 208 or cell 285 can be used for transmission to and reception from each user equipment (UE) 204. The uplink control information (UCI) such as periodic channel quality indicators (CQI), periodic precoding matrix indicator (PMI) and periodic rank indication (RI) can be sent on the physical uplink control channel (PUCCH). The physical uplink control channel (PUCCH) may occupy one resource block (RB) at each slot. Thus, a very limited amount of information can be transmitted on the physical uplink control channel (PUCCH).

In Release-8, Release-9 and Release-10 of 3GPP, each user equipment (UE) 204 is configured with a cell specific CSI-RS configuration with non-zero power. Each CSI-RS configuration determines the reference signal sequence, the periodicity of the transmission of the reference signal, the resource elements allocated for transmission of the reference signal and the antenna port allocated for the transmission of the reference signal. In addition, each user equipment (UE) 204 reporting parameters are configured in a UE-specific way. The reporting configuration determines the periodicity of each CSI measurement (e.g., CQI/PMI/PTI/RI)

In 3GPP LTE Release-10 (LTE-A or Advanced EUTRAN), carrier aggregation was introduced. Carrier aggregation may also be referred to as cell aggregation. Carrier aggregation is supported in both the uplink and the downlink with up to five component carriers (CCs) 206, 208. Each component carrier (CC) 206, 208 or cell 285 may have a transmission bandwidth of up to 210 resource blocks (i.e., up to 20 megahertz (MHz)). In carrier aggregation, two or more component carriers (CCs) 206, 208 are aggregated to support wider transmission bandwidths up to one hundred megahertz (MHz). A user equipment (UE) 204 may simultaneously receive and/or transmit on one or multiple component carriers (CCs) 206, 208, depending on the capabilities of the user equipment (UE) 204.

In addition, cyclic reporting of periodic CSI (e.g., CQI/PMI/PTI/RI) 241 of each component carrier (CC) 208 or cell is supported in Release-10. Thus, the same periodic channel state information (CSI) 241 as found in Release-8 may be used. In other words, Format 2 or Format 3 based physical uplink control channel (PUCCH) protocol may be used for CQI/PMI/PTI/RI reporting of component carriers (CC) 208 or cells 285.

The eNode B 202 may perform centralized scheduling of a multitude of cells. The physical transmission of information may take place from one Transmission Point (TP) 110 or many TPs 110*a-c*. Different TPs 110*a-c* may transmit information in the downlink 208 on different carriers 206 (or cells 285).

If two different (geographically separated) TPs 110 serve the same user equipment (UE) 204 in the same carrier 206, it is referred to as Coordinated Multipoint (CoMP) Transmission. The downlink transmission from two different TPs 110 may or may not have the same cell-ID. If they do not have the same cell-ID then one of them is the serving cell and the other is a neighboring cell. When the transmission/reception points have the same cell IDs as the macrocell 657, it is commonly understood that all the transmission points transmit the same cell-specific reference signal (CRS) but can transmit different channel state information reference signals (CSI-RSs).

In CoMP JT, the transmission parameters, such as precoding and/or coding and modulation scheme, the eNode B 202 may employ channel state information (CSI) 241 of the aggregated channel. This is because, in Release-11 and beyond, multiple CSI-RS (e.g., a First-RS and a Second-RS) might transmitted on the same component carrier. First-RS and Second-RS may refer to a first and second reference signal (RS). The CSI-RS configuration of First-RS and Second-RS may refer to as first and second reference signal (RS) configuration. First-RS configuration may refer to the single CSI-RS configuration that existed previously, i.e. Release 10 of 3GPP specification. First-RS and Second-RS may be configured to transmit First-RS and Second-RS channel state information (CSI) reports 236, respectively. First-RS and Second-RS correspond to CSI-RS index in CSI-RS configuration.

Enabling 3GPP Release-11 specification and future releases of 3GPP systems with the transmission of aggregated (e.g., combined, composite or effective) and per-CSI-RS (non-aggregated) CSI may be beneficial by increasing the system throughput and increasing resource utilization by enabling flexible scheduling. As such, the channel state information (CSI) 241 may need to be modified to be able to give proper measurements and feedback to the eNode B 202.

When a single reporting configuration such as in 3GPP Release-10 specifications is used, CQI, PMI, PTI and RI measurements are in a common format and type among both non-aggregated and aggregated measurements. However, to accommodate transmissions of CSI reports using CoMP, additional types may need to be included. For example, the channel state information (CSI) 241 may be modified to include aggregate measurements, such as an aggregated Channel Quality Indicator (agg_CQI), aggregated Precoding Matrix Indicator (agg_PMI), aggregated Precoding Type Indicator (agg_PTI) and aggregated Rank Indicator (agg_RI). The aggregated CSI information may be referred to as agg_CSI. It should be noted that agg_CSI is measured when two or more TPs 110 use the same carrier for a downlink 208 transmission.

Additionally, new channel state information (CSI) 241, such as relative phase and relative amplitude may be added. Relative phase and relative amplitude may be referred to as INTER-CSI-RS-PHASE and INTER-CSI-RS-AMPLITUDE, respectively. INTER-CSI-RS-PHASE may measure the relative phase of the received signals between a reference transmission point (TP) 110a (or channel state information reference signal (CSI-RS)) and another TP 110c (or CSI-RS). INTER-CSI-RS-AMPLITUDE may measure the relative amplitude of the received signals from a reference TP or point 110a (or CSI-RS) and another TP or point 110c (or CSI-RS).

When multiple channel state information (CSI) reports 236 from a single component carrier (CC) 208 (or cell 285) are scheduled to be reported in the same subframe, a collision will occur. Additionally, different types of channel state information (CSI) 241 from different component carriers (CC) 206 scheduled to be reported in the same subframe will also cause a collision. In other words, user equipment (UE) 204 that has multiple uplink control information (UCI) elements for transmission may experience a collision. Some collision resolution procedures have already been defined in 3GPP Release-10 specifications. Additional collision resolution procedures in 3GPP Release-11 specification and future releases of 3GPP may be needed. For example, in Coordinated Multipoint (CoMP) transmissions, collision resolution due to new Uplink Control Information (UCI) may need to be specified.

Due to the low payload size of the physical uplink control channel (PUCCH), some of the channel state information (CSI) reports 236 may be dropped during a collision. Thus, when a collision occurs, one or more channel state information (CSI) reports 236 may be dropped (i.e., not transmitted). Therefore, it may be beneficial to provide systems and methods to select which channel state information (CSI) reports 236 to transmit and which to drop.

In one configuration, collision resolution among CoMP related CSI 241 may follow the procedure for collision resolution among the non-CoMP CSI. However, because additional CSI 241 elements may be added to accommodate CoMP transmissions, non-CoMP methods may be inadequate. For example, INTER-CSI-RS-PHASE and INTER-CSI-RS-AMPLITUDE do not have equivalents in a non-CoMP CSI. This is because collision resolution for INTER-CSI-RS-PHASE and INTER-CSI-RS-AMPLITUDE with other UCI has not yet been defined.

Additionally, collision resolution procedures for when a CoMP related channel state information (CSI) report 236 collides with non-CoMP reports remains undefined. Thus, as an example, when an aggregate CQI (agg_CQI) collides with a rank indicator (RI), it is currently unclear as to which channel state information (CSI) report 236 to transmit and which channel state information (CSI) report 236 to drop.

The systems and methods described herein illustrate various methods of prioritization that support multiple reporting configurations. These methods support more than one CSI report configuration. This is made possible, in part, by corresponding prioritization rules and approaches. For example, prioritization based on CSI report configuration index is supported. Further, these methods support reporting types for aggregated CQI, PMI, PTI, RI, INTER-CSI-RS-PHASE and INTER-CSI-RS-AMPLITUDE. In other words, the methods may be prioritized, in part, on whether the channel state information (CSI) report 236 is associated with a CSI-RS or aggregated CSI.

In addition, unlike existing schemes employed in 3GPP Release-10 specifications where each CSI report configuration is associated with a single CSI-RS, each CSI report does not need to be associated with a single CSI-RS. In other words, each channel state information (CSI) report 236 may be associated with one or multiple CSI measurement, such as the First-CSI measurement, the Second-CSI, and/or the Aggregated-CSI measurement. Further, prioritization may occur not only within each serving cell, prioritization may also take place between multiple serving cells configured within the same user equipment (UE) 104. Prioritization may also employ radio resource control (RRC) signaling to determine the highest priority channel state information (CSI) report 251.

Another benefit of the systems and methods described herein is that an eNode B 102 is provided additional opportunities to schedule channel state information (CSI) reports 236. This, in turn, enables the eNode B 102 to more efficiently schedule resources, resulting in better usage of spectrum and improvements to user experience in a cellular network.

In one configuration, a channel state information (CSI) report 236 for each of the one or more CSI-RS configurations (e.g., the First-RS and the Second-RS) may be used. For example, the First-RS may correspond to one channel state information (CSI) report 236 and Second-RS may correspond to a second channel state information (CSI) report 236. Each report may support transmission of aggregated measurements as well. For example, the channel state information (CSI) report 236 for the First-RS may include measurements for the First-RS as well as measurements for the Aggregated-RS.

In one configuration, a new channel state information (CSI) report 236 may be configured for transmission of aggregated CQI, PMI, PTI and/or RI. For example, the aggregate measurements of the First-RS and the Second-RS may be transmitted as Aggregate-RS measurements in a channel state information (CSI) report 236 independent from the reports of the First-RS and the Second-RS measurements. In this case, INTER-CSI-RS-AMPLITUDE and INTER-CSI-RS-PHASE measurements may be carried in the reports associated with each CSI-RS. Alternatively, the INTER-CSI-RS-AMPLITUDE and INTER-CSI-RS-PHASE may be carried by the new channel state information (CSI) report 236 associated with aggregated CSI measurement (i.e., Aggregated-RS).

A user equipment (UE) 204 may communicate with an eNode B 202 using multiple component carriers (CCs) 208 or cells 285 at the same time. For example, a user equipment (UE) 204 may communicate with an eNode B 202 using a primary cell (PCell) 285a while simultaneously communicating with the eNode B 202 using secondary cell(s) (SCell) 285b. Similarly, an eNode B 202 may communicate with a user equipment (UE) 204 using multiple component carriers (CCs) 208 or cells 285 at the same time. For example, an eNode B 202 may communicate with a user equipment (UE) 204 using a primary cell (PCell) 285a while simultaneously communicating with the user equipment (UE) 204 using secondary cell(s) (SCell) 285b.

The eNode B 202 may include a transceiver 207 that includes a receiver 209 and a transmitter 213. An eNode B 202 may additionally include a decoder 203, an encoder 205 and an operations module 294. An eNode B 202 may receive uplink control information (UCI) using its one or more antenna ports, which may be realized by one or more physical antennas 297a-n and its receiver 209. The receiver 209 may use the demodulator 211 to demodulate the uplink control information (UCI).

The decoder 203 may include an uplink control information (UCI) receiving module 295. The eNode B 202 may use the uplink control information (UCI) receiving module 295 to decode and interpret the uplink control information (UCI) 293 received by the eNode B 202 (i.e., to decode and interpret the highest priority channel state information (CSI) report 251). The eNode B 202 may use the decoded uplink control information (UCI) 293 to perform certain operations, such as retransmit one or more packets based on scheduled communication resources for the user equipment (UE) 204. The uplink control information (UCI) 293 may include channel state information (CSI) 241 (e.g., CQI/PMI/PTI/RI).

The operations module 294 may include a retransmission module 296 and a scheduling module 298. The retransmission module 296 may determine which packets to retransmit (if any) based on the uplink control information (UCI) 293. The scheduling module 298 may be used by the eNode B 202 to schedule communication resources (e.g., bandwidth, time slots, frequency channels, spatial channels, etc.). The scheduling module 298 may use the uplink control information (UCI) 293 to determine whether (and when) to schedule communication resources for the user equipment (UE) 204.

The operations module 294 may provide data 201 to the encoder 205. For example, the data 201 may include packets for retransmission and/or a scheduling grant for the user equipment (UE) 204. The encoder 205 may encode the data 201, which may then be provided to the transmitter 213. The transmitter 213 may modulate the encoded data using the modulator 215. The transmitter 213 may transmit the modulated data to the user equipment (UE) 204 using one or more antenna ports, which may be realized by one or more physical antennas 297a-n.

When carrier aggregation is configured, the user equipment (UE) 204 may have only one radio resource control (RRC) connection with the network. At the radio resource control (RRC) connection establishment/re-establishment/handover, one serving cell 285 (i.e., the primary cell (PCell) 285a) provides the non-access stratum (NAS) mobility information (e.g., Tracking Area Identity (TAI)) and the security input.

In the downlink 108, the component carrier (CC) 208 corresponding to the primary cell (PCell) 285a is the downlink primary component carrier (DL PCC) 208a. In the uplink 106, the component carrier (CC) 206 corresponding to the primary cell (PCell) 285a is the uplink primary component carrier (UL PCC) 206a. Depending on the capabilities of the user equipment (UE) 204, one or more secondary component carriers (SCC) 206b, 208b or secondary cells (SCell) 285b may be configured to form a set of serving cells with the primary cell (PCell) 285a. In the downlink 108, the component carrier (CC) 208 corresponding to the secondary cell (SCell) 285b is the downlink secondary component carrier (DL SCC) 208b. In the uplink 106, the component carrier (CC) 206 corresponding to the secondary cell (SCell) 285b is the uplink secondary component carrier (UL SCC) 206b. The number of downlink component carriers (CCs) 208 may be different from the number of uplink component carriers (CCs) 206 because multiple cells may share one uplink component carrier (CC) 206. A component carrier (CC) is a carrier frequency to which cells belong.

If carrier aggregation is configured, a user equipment (UE) 204 may have multiple serving cells: a primary cell (PCell) 285a and one or more secondary cells (SCell) 285b. From a network perspective, a cell 285 may be used as the primary cell (PCell) 285a by one user equipment (UE) 204 and used as a secondary cell (SCell) 285b by another user equipment (UE) (not shown). If carrier aggregation is not configured, a primary cell (PCell) 285a operates a single serving cell operation. There may be one or more secondary cells (SCell) 285b in addition to the primary cell (PCell) 285a, if carrier aggregation is configured.

One benefit of using carrier aggregation is that additional downlink 108 and/or uplink 106 data may be transmitted. As a result of the additional downlink data, additional uplink control information (UCI) 293 may be needed.

A number of spatial channels may be available on each serving cell by using multiple antenna ports at a transmitter and a receiver. Therefore, multiple codewords (up to two codewords) may be transmitted simultaneously.

For periodic channel state information (CSI) 241 (e.g., CQI/PMI/PTI/RI) reporting for carrier aggregation, the configuration of different (in time) physical uplink control channel (PUCCH) resources for reports for each component carrier (CC) 206, 208 or cell 285 may be supported.

A channel state information (CSI) report 236 may be generated for each component carrier (CC) 206, 208 or cell 285. In Release-10, periodic channel state information (CSI) 241 reporting for up to five downlink component carriers (CCs) 208 (or cells 285) may be supported.

A channel state information (CSI) report 236 may be used to inform the eNode B 202 to adjust the transmission rate (modulation scheme and coding rate) dynamically based on the existing channel conditions at the user equipment (UE) 204. For example, a channel state information (CSI) report 236 may indicate a good channel quality at the user equipment (UE) 204. Here, the eNode B 202 may select a higher order modulation and coding rate, thereby achieving a higher transmission rate for the downlink transmission of data on the physical downlink shared channel (PDSCH). If a channel state information (CSI) report 236 indicates a poor channel quality at the user equipment (UE) 204, the eNode B 202 may select a lower order modulation and coding rate, thereby achieving higher reliability for the transmission.

A channel state information (CSI) report 236 may be referred to as a rank indication (RI) report if the channel state information (CSI) report 236 only includes rank indication (RI). A channel state information (CSI) report 236 may be referred to as a channel quality indicator (CQI) report if the channel state information (CSI) report 236 only includes a channel quality indicator (Cal). A channel state information (CSI) report 236 may be referred to as a precoding matrix indicator (PMI) report if the channel state information (CSI) report 236 only includes a precoding matrix indicator (PMI). A channel state information (CSI) report 236 may be referred to as a precoding type indicator (PTI) report if the channel state information (CSI) report 236 only includes a precoding type indicator (PTI).

Each channel state information (CSI) report 236 may also include a physical uplink control channel (PUCCH) reporting type for physical uplink control channel (PUCCH) transmissions. For each reporting mode, there are different reporting types. The channel state information (CSI) selection module 257 may receive multiple channel state information (CSI) reports 236. Each channel state information (CSI) report 236 may be scheduled to be transmitted to an eNode B 102 during a subframe. Thus, when more than one channel state information (CSI) report 236 is generated, the channel state information (CSI) reports 236 may collide.

When channel state information (CSI) reports 236 collide with each other, the collision may be resolved by prioritizing the channel state information (CSI) reports 236. The prioritization can be based on content (or type) as defined in Release-10, based on content/type with new types to be defined that support aggregated CSI reporting, based on the CSI-RS resource that includes the CSI-RS index, periodicity, number of antenna ports, etc. and/or based on the serving cell index, as defined in Release-10.

In 3GPP Release-10 specifications, the prioritization mechanism as shown in Table 2 may be used.

TABLE 2

| PUCCH Reporting Type | Reported |
| --- | --- |
| 1 | Sub-band CQI |
| 1a | Sub-band CQI/second PMI |
| 2 | Wideband CQI/PMI |
| 2a | Wideband first PMI |
| 2b | Wideband CQI/second PMI |
| 2c | Wideband CQI/first PMI/second PMI |
| 3 | RI |
| 4 | Wideband CQI |
| 5 | RI/first PMI |
| 6 | RI/PTI |

A report with PUCCH reporting type {1} may support channel quality indicator (CQI) feedback for UE-selected subbands. A report with PUCCH reporting type {1a} may support subband channel quality indicator (CQI) and the second precoding matrix indicator (PMI) feedback. A report with PUCCH reporting type {2}, PUCCH reporting type {2b} or PUCCH reporting type {2c} may support wideband channel quality indicator (CQI) and precoding matrix indicator (PMI) feedback. A report with PUCCH reporting type {2a} may support wideband precoding matrix indicator (PMI) feedback. A report with PUCCH reporting type {3} may support rank indication (RI) feedback. A report with PUCCH reporting type {4} report may support wideband channel quality indicator (CQI) feedback. A report with PUCCH reporting type {5} may support rank indication (RI) and wideband precoding matrix indicator (PMI) feedback. A report with PUCCH reporting type {6} may support rank indication (RI) and precoder type indication (PTI) feedback.

In one configuration, when a collision between a channel state information (CSI) report 236 with PUCCH reporting type {3}, {5} or {6} of one serving cell and a channel state information (CSI) report 236 with PUCCH reporting type {1}, {1a}, {2}, {2a}, {2b}, {2c} or {4} of the same serving cell occurs, the latter channel state information (CSI) report 236 with PUCCH reporting type (type {1}, {1a}, {2}, {2a}, {2b}, {2c} or {4}) has lower priority and may be dropped. In other words, channel state information (CSI) reports 236 with RI included in the type (type {3}, {5} or {6}) may be prioritized over channel state information (CSI) reports 236 without RI included in the type.

In another configuration, if the user equipment (UE) 204 is configured with more than one serving cells, the user equipment (UE) 204 transmits a channel state information (CSI) report 236 of only one serving cell in any given subframe. For a given subframe, in case of collision of a channel state information (CSI) report 236 with PUCCH reporting type {2a}, {3}, {5} or {6} of one serving cell with a channel state information (CSI) report 236 with PUCCH reporting type {1}, {1a}, {2a}, {2b}, {2c} or {4} of another serving cell, the latter CSI with PUCCH reporting type (type {1}, {1a}, {2a}, {2b}, {2c} or {4}) has lower priority and may be dropped.

In another configuration, for a given subframe, in cases where a collision between a channel state information (CSI) report 236 with PUCCH reporting type {2}, {2b}, {2c} or {4} of one serving cell and channel state information (CSI) report 236 with PUCCH reporting type {1} or {1a} of another serving cell occurs, the latter channel state information (CSI) report 236 with PUCCH reporting type {1} or {1a} has lower priority and may be dropped.

In yet another configuration, for a given subframe, in cases where a collision between channel state information (CSI) reports 236 of different serving cells with PUCCH reporting types of the same priority occurs, the channel state information (CSI) report 236 of the serving cell with the lower or lowest serving cell index (i.e., ServCellIndex) may be reported and the channel state information (CSI) report 236 of all other serving cells may be dropped.

Variations to the PUCCH reporting type may be employed to accommodate multiple CSI-RS and aggregated CSI. For example, Table 3 below illustrates one example that may be used for new types to accommodate multiple CSI-RS and aggregated CSI. Table 3 below also illustrates how INTER-CSI-RS-PHASE and INTER-CSI-RS-AMPLITUDE types may be reported. Many other variations may also be used.

Table 3 also shows PUCCH reporting types (or content) that allow for First-RS, Second-RS and/or Aggregated-RS reports. Additionally, Aggregated-RS may include configurations and/or measurements for aggregated channel state information (CSI) reports 236.

By introducing Second-RS and/or Aggregated-RS, new type (or content) based prioritization approaches may need to be added accommodate for these types. Further, with the introduction of additional serving cells, and because there is only one report per serving cell, the content (or type) of each channel state information (CSI) report 236 should identify that it is related to a CSI-RS (i.e., First-RS and Second-RS). Alternatively, the channel state information (CSI) report 236 should identify if the channel state information (CSI) report 236 is an aggregated CSI. In Table 3, modifications to current types are indicated in bold.

TABLE 3

| PUCCH Reporting Type | Reported |
|---|---|
| 1 | First-RS Sub-band CQI |
| 1a | First-RS Sub-band CQI and First-RS second PMI |
| 1b' | Second-RS Sub-band CQI |
| 1c' | First-RS Sub-band CQI and Second-RS Sub-band CQI |
| 1d' | Aggregated-RS Sub-band CQI |
| 1e' | First-RS Sub-band CQI and Second-RS Sub-band CQI |
| 2 | First-RS Wideband CQI and PMI |
| 2a | First-RS Wideband first PMI |
| 2b | First-RS Wideband CQI and First-RS second PMI |
| 2c | First-RS Wideband CQI and First-RS first PMI and First-RS second PMI |
| 2d' | Second-RS Wideband PMI |
| 2e' | Aggregated-RS Wideband PMI |
| 2f' | First-RS Wideband PMI and Second-RS Wideband PMI |
| 3 | First-RS RI |
| 3a' | Second-RS RI |
| 3b' | Aggregated-RS RI |
| 3c' | First-RS RI and Second-RS RI and Aggregated-RS RI |
| 4 | First-RS Wideband CQI |
| 4a' | Second-RS Wideband CQI |
| 4b' | Aggregated-RS Wideband CQI |
| 4c' | First-RS Wideband CQI and Second-RS Wideband CQI and Aggregated-RS Wideband CQI |
| 5 | First-RS RI and First-RS first PMI |
| 5a' | Second-RS RI and Second-RS first PMI |
| 5b' | Aggregated-RS RI and Aggregated RS first PMI |
| 5c' | First-RS RI and First-RS first PMI and Second-RS RI and Second-RS first PMI |
| 6 | First-RS RI and First-RS PTI |
| 6a' | Second-RS RI and Second-RS PTI |
| 6b' | Aggregated-RS RI and Aggregated-RS PTI |
| 6c' | First-RS RI and First-RS PTI and Second-RS RI and Second-RS PTI |
| 7 | Aggregated wideband CQI and INTER-CSI-RS-PHASE |
| 7a | Aggregated subband CQI and INTER-CSI-RS-PHASE |
| 7b | First-RS wideband CQI and INTER-CSI-RS-PHASE |
| 7c | Second-RS wideband CQI and INTER-CSI-RS-PHASE |
| 8 | Aggregated PMI and INTER-CSI-RS-AMPLITUDE |
| 8a | Aggregated wideband PMI and INTER-CSI-RS-AMPLITUDE |
| 8b | First-RS wideband PMI and INTER-CSI-RS-AMPLITUDE |
| 8c | Second-RS wideband PMI and INTER-CSI-RS-AMPLITUDE |

A report with PUCCH reporting type {1} may support channel quality indicator (CQI) feedback for First-RS UE-selected subbands. A report with PUCCH reporting type {1a} may support First-RS subband channel quality indicator (CQI) and the First-RS second precoding matrix indicator (PMI) feedback. A report with PUCCH reporting type {1b'} may support channel quality indicator (CQI) feedback for Second-RS UE-selected subbands. A report with PUCCH reporting type {1c'} may support Second-RS subband channel quality indicator (CQI) and the Second-RS second precoding matrix indicator (PMI) feedback. A report with PUCCH reporting type {1d'} may support channel quality indicator (CQI) feedback for Aggregated-RS UE-selected subbands. A report with PUCCH reporting type {1e'} may support Aggregated-RS subband channel quality indicator (CQI) and the Aggregated-RS second precoding matrix indicator (PMI) feedback.

A report with PUCCH reporting type {2} may support First-RS wideband channel quality indicator (CQI) and precoding matrix indicator (PMI) feedback. A report with PUCCH reporting type {2a} may support First-RS wideband first precoding matrix indicator (PMI) feedback. A report with PUCCH reporting type {2b} or PUCCH reporting type {2c} may support First-RS wideband channel quality indicator (CQI) and First-RS second precoding matrix indicator (PMI) feedback. A report with PUCCH reporting type {2c} may also support First-RS first precoding matrix indicator (PMI) feedback. A report with PUCCH reporting type {2d'} may support Second-RS wideband precoding matrix indicator (PMI) feedback. A report with PUCCH reporting type {2e'} may support Aggregated-RS wideband precoding matrix indicator (PMI) feedback. A report with PUCCH reporting type {2f'} may support First-RS wideband precoding matrix indicator (PMI) and Second-RS wideband precoding matrix indicator (PMI) feedback.

A report with PUCCH reporting type {3} may support First-RS rank indication (RI) feedback. A report with PUCCH reporting type {3a'} may support Second-RS rank indication (RI) feedback. A report with PUCCH reporting type {3b'} may support Aggregated-RS rank indication (RI) feedback. A report with PUCCH reporting type {3c'} may support First-RS rank indication (RI) feedback, Second-RS rank indication (RI) and Aggregated-RS rank indication (RI) feedback.

A report with PUCCH reporting type {4} may support First-RS wideband channel quality indicator (CQI) feedback. A report with PUCCH reporting type {4a'} may support Second-RS wideband channel quality indicator (CQI) feedback. A report with PUCCH reporting type {4b'} may support Aggregated-RS wideband channel quality indicator (CQI) feedback. A report with PUCCH reporting type {4c'} may support First-RS wideband channel quality indicator (CaI), Second-RS wideband channel quality indicator (CQI) and Aggregated-RS wideband channel quality indicator (CQI) feedback.

A report with PUCCH reporting type {5} may support First-RS rank indication (RI) and First-RS wideband precoding matrix indicator (PMI) feedback. A report with PUCCH reporting type {5a'} may support Second-RS rank indication (RI) and Second-RS wideband precoding matrix indicator (PMI) feedback. A report with PUCCH reporting type {5b'} may support Aggregated-RS rank indication (RI) and Aggregated-RS wideband precoding matrix indicator (PMI) feedback. A report with PUCCH reporting type {5c'} may support First-RS rank indication (RI), First-RS first wideband precoding matrix indicator (PMI), Second-RS rank indication (RI) and Second-RS first wideband precoding matrix indicator (PMI) feedback.

A report with PUCCH reporting type {6} may support First-RS rank indication (RI) and First-RS precoder type indication (PTI) feedback. A report with PUCCH reporting type {6a'} may support Second-RS rank indication (RI) and Second-RS precoder type indication (PTI) feedback. A report with PUCCH reporting type {6b'} may support Aggregated-RS rank indication (RI) and Aggregated-RS precoder type indication (PTI) feedback. A report with PUCCH reporting type {6c'} may support First-RS rank indication (RI), First-RS precoder type indication (PTI), Second-RS rank indication (RI) and Second-RS precoder type indication (PTI) feedback.

A report with PUCCH reporting type {7} may support Aggregated wideband CQI and INTER-CSI-RS-PHASE feedback. A report with PUCCH reporting type {7a} may support Aggregated subband CQI and INTER-CSI-RS-PHASE feedback. A report with PUCCH reporting type {7b} may support First-RS wideband CQI and INTER-CSI-RS-PHASE feedback. A report with PUCCH reporting type {7c} may support Second-RS wideband CQI and INTER-CSI-RS-PHASE feedback.

A report with PUCCH reporting type {8} may support Aggregated PMI and INTER-CSI-RS-AMPLITUDE feedback. A report with PUCCH reporting type {8a} may support Aggregated wideband PMI and INTER-CSI-RS-AMPLITUDE feedback. A report with PUCCH reporting type {8b} may support First-RS wideband PMI and INTER-CSI-RS-AMPLITUDE feedback. A report with PUCCH reporting type {8c} may support Second-RS wideband PMI and INTER-CSI-RS-AMPLITUDE feedback.

Figure 4:
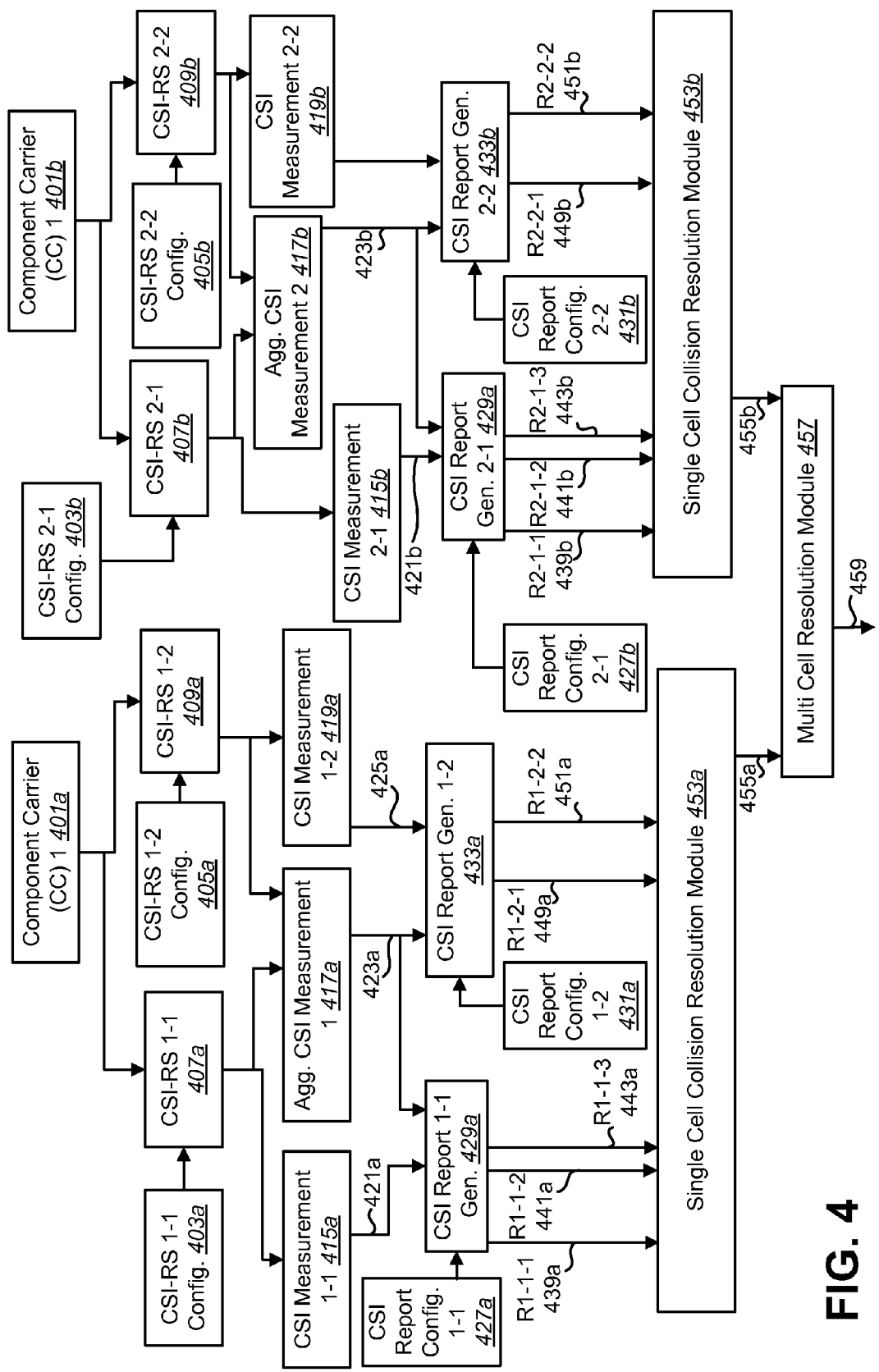
FIG. 4 is a block diagram illustrating another configuration of CSI-RS resources, measurements and reporting in a user equipment (UE) serving cell.

FIG. 4 is a block diagram illustrating another configuration of CSI-RS resources, measurements and reporting in a user equipment (UE) 104 serving cell. The component carrier (CC) 401, CSI-RS 1-1 403, CSI-RS 1-2 405, CSI-RS 1-1 407, CSI-RS 1-2 409, CSI measurement 1-1 415, aggregate CSI measurement 417, CSI measurement 1-2 419, channel state information (CSI) 1-1 421, channel state information (CSI) Agg-1 423, channel state information (CSI) 1-2 425, single cell collision resolution module 453, channel state information (CSI) highest reports 455 and multi cell resolution module 457 of FIG. 4 correspond to similar components 101, 103, 105, 107, 109, 115, 117, 119, 121, 123, 125, 153, 155 and 157 of FIG. 2. Additionally, channel state information (CSI) report generator 1-1 429a, channel state information (CSI) report generator 2-1 429b, channel state information (CSI) report generator 1-2 433a and channel state information (CSI) report generator 2-2 429b of FIG. 4 may correspond to the channel state information (CSI) report generator 1-1 129a of FIG. 2. Further, CSI report configuration 1-1 427a, CSI report configuration 2-1 427b, CSI report configuration 1-2 431a and CSI report configuration 2-2 431a may correspond to the CSI report configuration 1 127 of FIG. 2.

In one configuration, the user equipment (UE) 104 may employ multiple channel state information (CSI) report generators 1-1 429a and 1-2 433a for each component carrier (CC) 401a corresponding to each CSI-RS (e.g., CSI-RS 1-1 407a and CSI-RS 1-2 409a). Each channel state information (CSI) report generators 429a and 433a may have a corresponding CSI report configuration 427a and 431a, respectively. For example, channel state information (CSI) report generator 1-1 429a may receive instructions from CSI report configuration 1-1 427a.

The channel state information (CSI) report generator 1-1 429a may generate channel state information (CSI) reports (e.g., R1-1-1 439a, R1-1-2 441a, R1-1-3 443a). Channel state information (CSI) reports (e.g., R1-1-1 439a, R1-1-2 441a, R1-1-3 443a) may be in Rx-y-z format where x is serving cell index, y is CSI report configuration index and z is report index. Thus, z may describe the number of the reports generated at a subframe. For example, R1-1-3 refers to the third report generated corresponding to the first CSI-RS of the first serving cell. The first report R1-1-1 439a may correspond to CSI-RS 1-1 407a. The second report R1-1-1 441a may correspond to CSI-RS 1-2 409a. The third report R1-1-3 443a may be optional and may correspond to the aggregate of CSI-RS 1-1 407a and CSI-RS 1-2 409a or a subset thereof. In order to report on aggregate channel state information (CSI), the aggregate channel state information (CSI) 423a may be sent to both channel state information (CSI) report generator 1-1 429a and channel state information (CSI) report generator 1-2 433a.

Similar to channel state information (CSI) report generator 1-1 429a, channel state information (CSI) report generator 1-2 433a may send channel state information (CSI) reports (e.g., R1-2-1 449a and R1-2-2 451a) to the single cell collision resolution module 453a.

Figure 5:
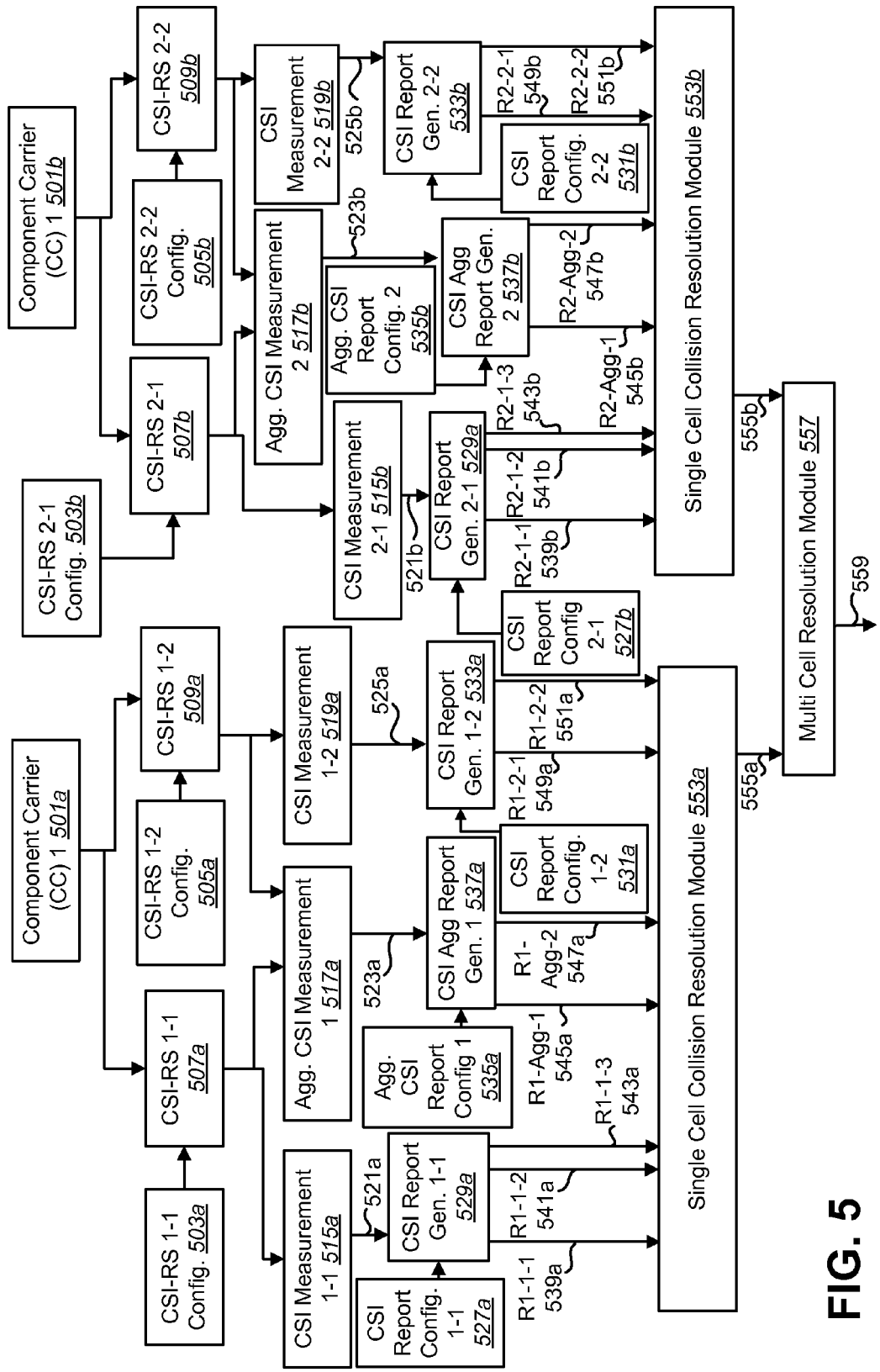
FIG. 5 is a block diagram illustrating yet another configuration of CSI-RS resources, measurements and reporting in a user equipment (UE) serving cell.

FIG. 5 is a block diagram illustrating yet another configuration of CSI-RS resources, measurements and reporting in a user equipment (UE) 104 serving cell. The component carrier (CC) 501, CSI-RS 1-1 503, CSI-RS 1-2 505, CSI-RS 1-1 507, CSI-RS 1-2 509, CSI measurement 1-1 515, aggregate CSI measurement 517, CSI measurement 1-2 519, channel state information (CSI) 1-1 521, channel state information (CSI) Aggregate 523, channel state information (CSI) 1-2 525, single cell collision resolution module 553, channel state information (CSI) highest reports 555 and multi cell resolution module 557 of FIG. 5 correspond to similar components 101, 103, 105, 107, 109, 115, 117, 119, 121, 123, 125, 153, 155 and 157 of FIG. 2. Additionally, channel state information (CSI) report generator 1-1 529a, channel state information (CSI) report generator 2-1 529b, channel state information (CSI) report generator 1-2 533a, channel state information (CSI) report generator 2-2 529b, CSI report configuration 1-1 527a, CSI report configuration 2-1 527b, CSI report configuration 1-2 531a, CSI report configuration 2-2 531a and channel state information (CSI) reports R1-1-1 539, R1-1-2 541, R1-1-3 543, R1-2-1 549 and R1-2-2 551 of FIG. 5 may correspond similar components 429a, 429b, 433a, 433b, 427a, 427b, 431a, 431b, 439, 441, 443, 449 and 451 of described in connection with FIG. 4.

In one configuration, the user equipment (UE) 104 may employ an additional aggregate channel state information (CSI) report generator 529a for component carrier (CC) 501a. The aggregate channel state information (CSI) report generator 529a may receive direction from an aggregates CSI report configuration 535a. The aggregate channel state information (CSI) report generator 529a may generate aggregate channel state information (CSI) reports R1-Agg-1 545a, R1-Agg-2 547a and send the aggregate channel state information (CSI) reports R1-Agg-1 545a, R1-Agg-2 547a to the single cell collision resolution module 553a.

As discussed above, a new channel state information (CSI) report 236 may be configured for transmission of aggregated CQI, PMI, PTI and/or RI. In one configuration, the aggregate measurements 517*a* of the First-RS 507*a* and the Second-RS 509*a* may be transmitted as Aggregate-RS measurements 523*a* in a channel state information (CSI) report R1-Agg-1 545*a* independent from the reports of the First-RS R1-1-1 539*a* and the Second-RS R1-2-1 549*a*. In this case, INTER-CSI-RS-AMPLITUDE and INTER-CSI-RS-PHASE measurements may be carried in the reports associated with each CSI-RS. In another configuration, the INTER-CSI-RS-AMPLITUDE and INTER-CSI-RS-PHASE may be carried by the new channel state information (CSI) report R1-2-2 551*a* associated with aggregated CSI measurement 523*a*.

Figure 6:
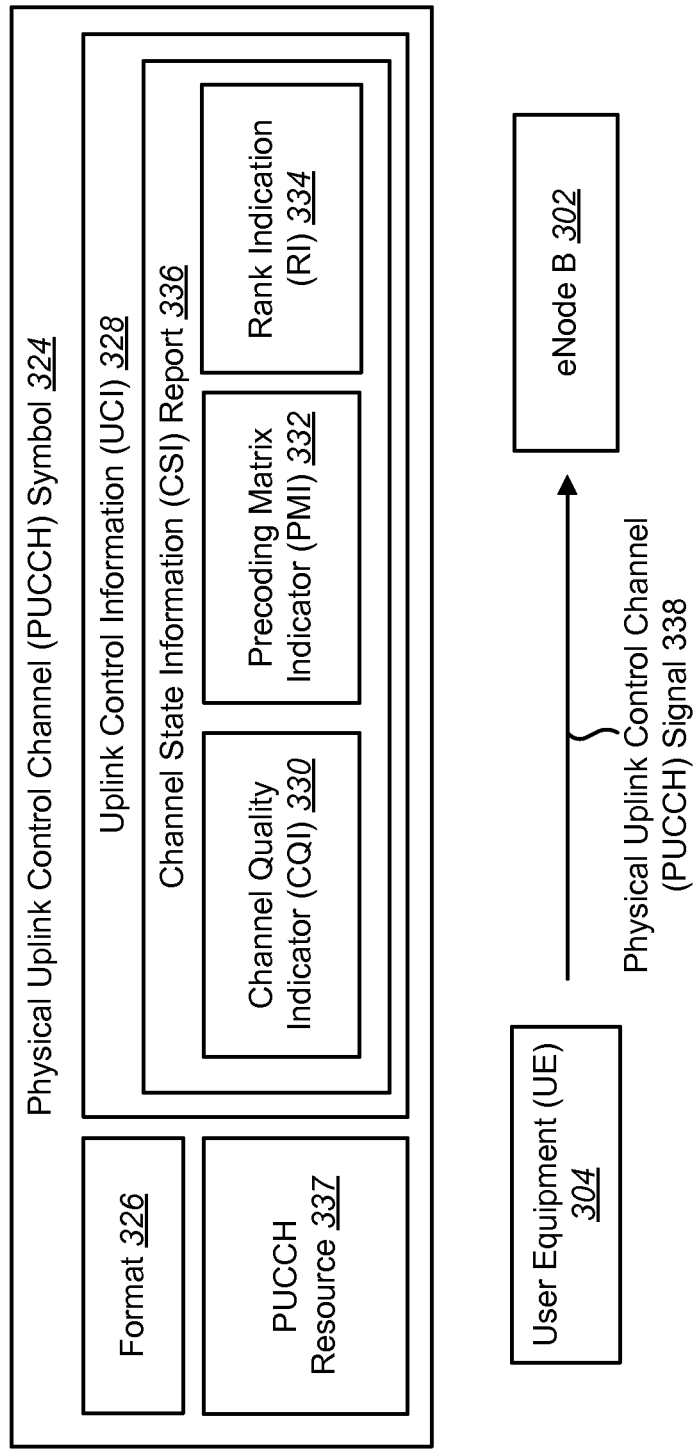
FIG. 6 is a block diagram illustrating transmissions from a user equipment (UE) to an eNode B during a subframe.

FIG. 6 is a block diagram illustrating transmissions from a user equipment (UE) 304 to an eNode B 302 during a subframe. The user equipment (UE) 304 may transmit a physical uplink control channel (PUCCH) symbol 324 via a physical uplink control channel (PUCCH) signal 338 to the eNode B 302.

The physical uplink control channel (PUCCH) symbol 324 may include uplink control information (UCI) 328. The uplink control information (UCI) 328 may include a highest priority periodic channel state information (CSI) report 336. A channel state information (CSI) report 336 refers to the channel state information (CSI) of each of the downlink component carriers (CCs) 208. Because the physical uplink control channel (PUCCH) can only include one channel state information (CSI) report 336, the physical uplink control channel (PUCCH) symbol may only include the highest priority channel state information (CSI) report 251. The channel state information (CSI) report 336 may include a channel quality indicator (CQI) 330, a precoding matrix indicator (PMI) 332 and/or a rank indication (RI) 334. A channel quality indicator (CQI) 330 indicates the modulation and coding rate. A precoding matrix indicator (PMI) 332 indicates the codebook for precoding using multiple-input and multiple-output (MIMO). The rank indication (RI) 334 is the number of useful transmission layers for a multiple-input and multiple-output (MIMO) transmission.

The CQI, PMI and RI may be reported in a periodic channel state information (CSI) report 336. The highest priority channel quality indicator (CQI) report from a frequency selective scheduling mode may be transmitted on the physical uplink control channel (PUCCH) as a channel state information (CSI) report 336. Periodic channel state information (CSI) reports 336 from a frequency non-selective scheduling mode may be transmitted on the physical uplink control channel (PUCCH). In other words, for a frequency non-selective scheduling mode, only periodic channel quality indicator (CQI) feedback is needed.

In Release-8/9, only one component carrier (CC) 208 (or cell 285) is allocated for a user equipment (UE) 304. Thus, only one periodic channel state information (CSI) report 336 is generated (i.e., CQI and/or PMI and/or RI for one component carrier (CC) 208 per cell 285 is reported).

In Release-10 and beyond, multiple component carriers (CCs) 208 (or cells 285) may be configured for a user equipment (UE) 304. Thus, multiple periodic channel state information (CSI) reports 336 corresponding to a single component carrier (CC) 208 (or cell 285) may collide in the same subframe (i.e., the multiple periodic channel state information (CSI) reports 336 may have schedules that would force them to be transmitted in the same subframe). With the introduction of multiple component carriers (CCs) 208 (or cells 285) in Release-10 or LTE-Advanced (LTE-A), the amount of channel state information (CSI) that needs to be reported can increase significantly, since the channel state information (CSI) report 336 for each of the component carriers (CCs) 208 (or cells 285) needs to be reported. However, the physical uplink control channel (PUCCH) may only be able to support transmission of one channel state information (CSI) report 336 for one component carrier (CC) 208 (or cells 285). Thus, the highest priority channel state information (CSI) report 251 may be carried on the physical uplink control channel (PUCCH) while the remaining periodic channel state information (CSI) reports 336 are dropped. The priority of different types of uplink control information (UCI) 328 may be provided by the eNode B 302 or by predefined rules. Some of the predefined rules are disclosed herein.

The channel state information (CSI) (e.g., CQI/PMI/PTI/RI) 241 of each component carrier (CC) 208 (or cell 285) may be scheduled on the physical uplink control channel (PUCCH) periodically by higher layer 218 signaling. The eNode B 302 may request periodic channel state information (CSI) reporting. The periodic channel state information (CSI) 336 may have a periodic reporting schedule. The eNode B 102 may also request transmission of CSI 241. Such a request may be made through the physical downlink control channel (PDCCH). The physical uplink control channel (PUCCH) symbol 324 may be sent only on the primary cell (PCell) 285*a*.

The physical uplink control channel (PUCCH) symbol 324 may further include a format 326 for which the physical uplink control channel (PUCCH) symbol 324 is transmitted. For example, the physical uplink control channel (PUCCH) symbol 324 may be transmitted using Format 1/1a/1b, Format 2/2a/2b, Format 3/3a/3b or any other new formats. As used herein, Format 1/1 a/1b represents Format 1 and/or Format 1a and/or Format 1b. In addition, as used herein, Format 2/2a/2b represents Format 2 and/or Format 2a and/or Format 2b. Herein, Format 3/3a/3b represents Format 3 and/or Format 3a and/or Format 3b.

The physical uplink control channel (PUCCH) symbol 324 may also include a physical uplink control channel (PUCCH) resource 337. The physical uplink control channel (PUCCH) resource 337 for the periodic CSI 241 may be periodically pre-assigned by a higher layer 218 that uses Format 2/2a/2b. It may be possible in Release-10 or a future release to transmit periodic CQI/PMI/PTI/RI using Format 3/3a/3b.

When multiple channel state information (CSI) reports 336 from a single component carrier (CC) 208 (or cell 285) are scheduled to be reported in the same subframe, this may be referred to as a collision. A collision may also occur when different types of channel state information (CSI) 241 from the same component carrier (CC) 208 (or cell 285) (e.g., CQI/PMI and RI) are scheduled to be reported in the same subframe. When a collision occurs, due to the low payload size of the physical uplink control channel (PUCCH), the user equipment (UE) 304 may select only one periodic channel state information (CSI) report 336 to be transmitted on the physical uplink control channel (PUCCH). As a result, some of the periodic channel state information (CSI) reports 336 may be dropped.

Figure 7:
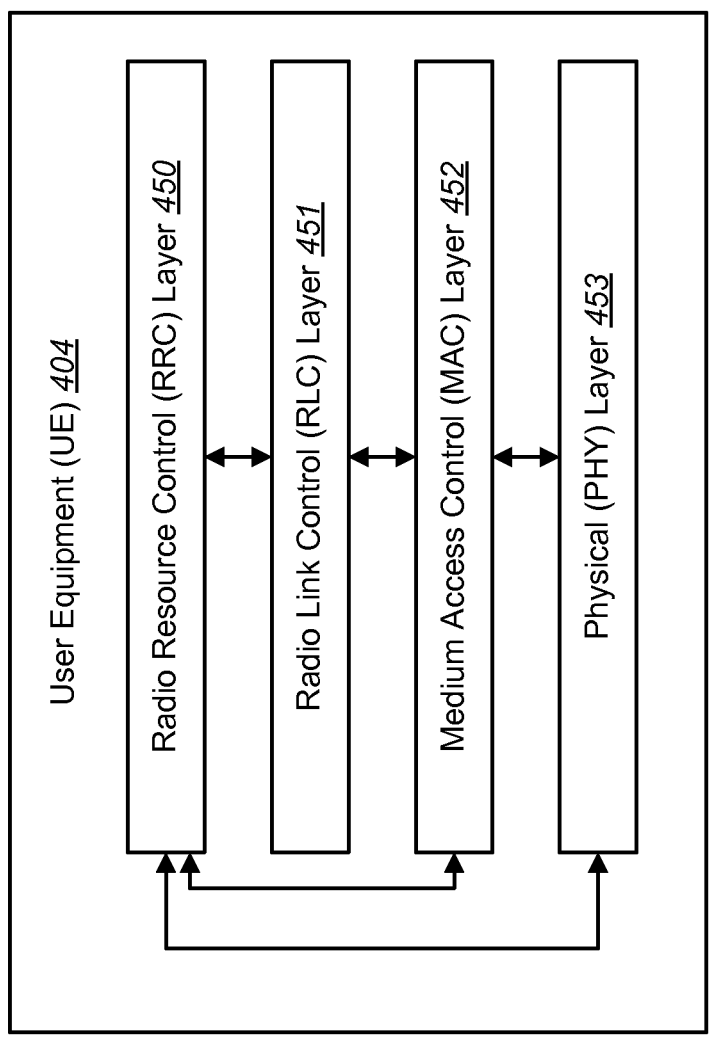
FIG. 7 is a block diagram illustrating the layers used by a user equipment (UE)

FIG. 7 is a block diagram illustrating the layers used by a user equipment (UE) 404. The user equipment (UE) 404 of FIG. 7 may be one configuration of the user equipment (UE) 104 of FIG. 1. The user equipment (UE) 404 may include a radio resource control (RRC) layer 450, a radio link control (RLC) layer 451, a medium access control (MAC) layer 452 and a physical (PHY) layer 453. These layers may be referred to as higher layers 218. The user equipment (UE) 404 may include additional layers not shown in FIG. 7.

Figure 8:
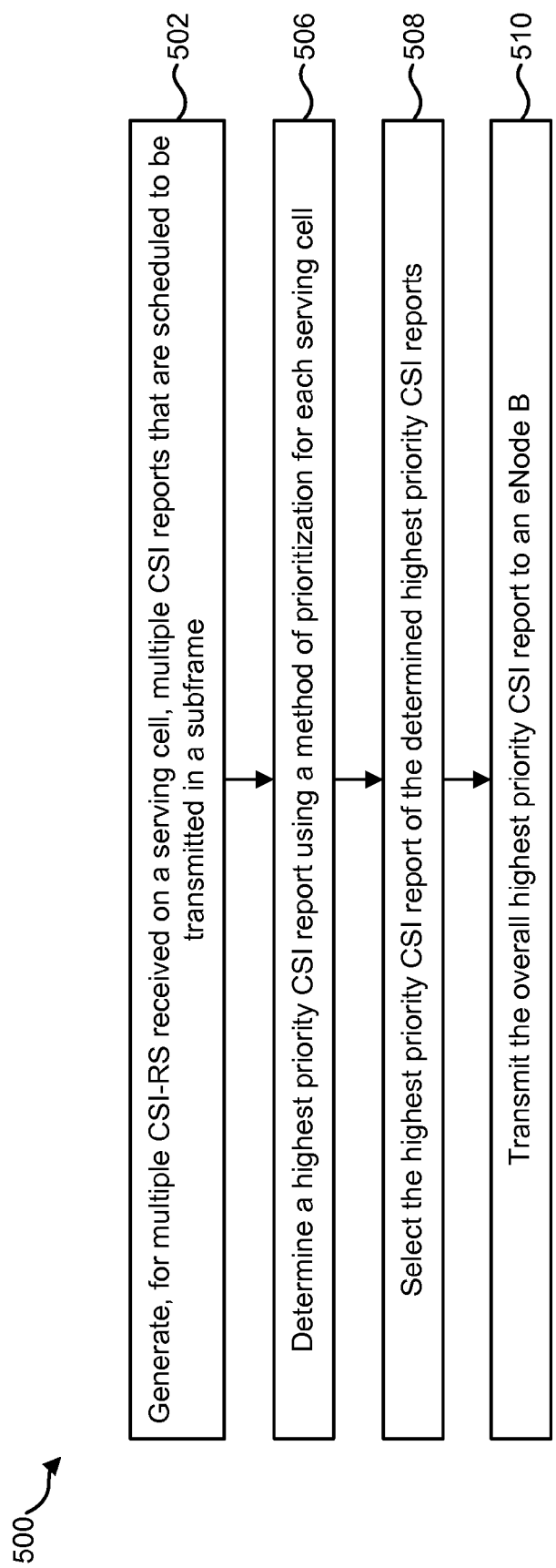
FIG. 8 is a flow diagram of a method for determining a highest priority channel state information (CSI) report.

FIG. 8 is a flow diagram of a method 500 for determining a highest priority channel state information (CSI) report 251. The method 500 may be performed by a user equipment (UE) 104. In one configuration, the method 500 may be performed by a channel state information (CSI) selection module 257 on a user equipment (UE) 104. The user equipment (UE) 104 may generate 502, for multiple CSI-RS received on a serving cell, multiple channel state information (CSI) reports 236 that are scheduled to be transmitted in a subframe. Thus, there may be a collision between the multiple channel state information (CSI) reports 236.

Examples of methods of prioritization include reporting-type based prioritization and CSI reporting-configuration based prioritization. When collisions of channel state information (CSI) reports 236 occur in the same serving cell, reporting-type based prioritization may be applied. CSI reporting-configuration based prioritization may also be applied. Similarly, when channel state information (CSI) reports 236 from different serving cells cause a collision, reporting-type based prioritization may be applied. CSI reporting-configuration based prioritization may also be applied. Additionally, cell-index based prioritization may be applied. These prioritization approaches are discussed in additional detail below.

The user equipment (UE) 104 may determine 506 a highest priority channel state information (CSI) report 251 using a method of prioritization for each serving cell. For example, if there is only a single CSI-RS in the serving cell, the user equipment (UE) 104 may determine 506 the highest priority channel state information (CSI) report 251 for that CSI-RS. If there are multiple CSI-RS and/or multiple CSI report configurations in the serving cell, the user equipment (UE) 104 may determine 506 the highest priority channel state information (CSI) report 251 for each CSI-RS or each CSI report configuration in the serving cell. Additionally, the user equipment (UE) 104 may determine 506 the highest priority channel state information (CSI) report 251 between CSI-RSs or between CSI report configurations in the serving cell. Additionally, the user equipment (UE) 104 may also determine the highest priority channel state information (CSI) report 251 between serving cells in the case of multiple serving cells.

The user equipment (UE) 104 may then select 508 the highest priority channel state information (CSI) report 251 of the determined highest priority CSI reports 251. If there is only one serving cell, only one highest priority channel state information (CSI) report 251 is determined and is thus selected 508.

In the case of multiple CSI-RSs in the serving cell, each CSI-RS may have its own highest priority CSI report 251. For example, the highest priority channel state information (CSI) report 251 of each CSI-RS may be referred to as a CSI-RS highest priority channel state information (CSI) report. In this case, an overall highest priority channel state information (CSI) report 251 of all the CSI-RSs may be selected 508. The overall highest priority channel state information (CSI) report 251 may be the channel state information (CSI) report 236 that has the highest priority among the channel state information (CSI) reports 236 for the CSI-RSs. In other words, the highest priority channel state information (CSI) report 251 between the multiple CSI-RSs in a single serving cell may be selected as the overall highest priority channel state information (CSI) report 251 (or may also be referred as the highest priority channel state information (CSI) report).

In the case of multiple CSI report configurations in the serving cell, each CSI report configuration may have its own highest priority CSI report 251. For example, the highest priority channel state information (CSI) report 251 of each CSI report configuration may be referred to as a CSI highest priority channel state information (CSI) report. In this case, an overall highest priority channel state information (CSI) report 251 of all the CSI report configurations may be selected 508.

The overall highest priority channel state information (CSI) report 251 may be the channel state information (CSI) report 236 that has the highest priority among the channel state information (CSI) reports 236 for the CSI report configurations. In other words, the highest priority channel state information (CSI) report 251 between the multiple CSI report configurations in a single serving cell may be selected as the overall highest priority channel state information (CSI) report 251.

In the case of multiple serving cells, each serving cell may have its own highest priority CSI report 251. For example, an overall highest priority channel state information (CSI) report 251 of all the serving cells may be selected 508. The overall highest priority channel state information (CSI) report 251 may be the channel state information (CSI) report 236 that has the highest priority among the channel state information (CSI) reports 236 for the serving cells. In other words, the highest priority channel state information (CSI) report 251 between the multiple CSI-RSs in a single serving cell may be selected as the overall highest priority channel state information (CSI) report 251.

The user equipment (UE) 104 may transmit 510 the overall highest priority channel state information (CSI) report 251 to an eNode B 102. In one configuration, the user equipment (UE) 104 may transmit 510 the selected highest priority channel state information (CSI) report 251 to the eNode B 102 using the physical uplink control channel (PUCCH).

One benefit of using different prioritization schemes is that it allows for a more flexible prioritization scheme compared to prioritization based on only radio resource control (RRC) signaling (which can only be changed semi-statically and not dynamically and does not take into account feedback content). Furthermore, using different prioritization schemes allows for prioritization based on the number of feedback bits (e.g., lower payload feedback can be prioritized over higher payload feedback and vice versa).

Figure 9:
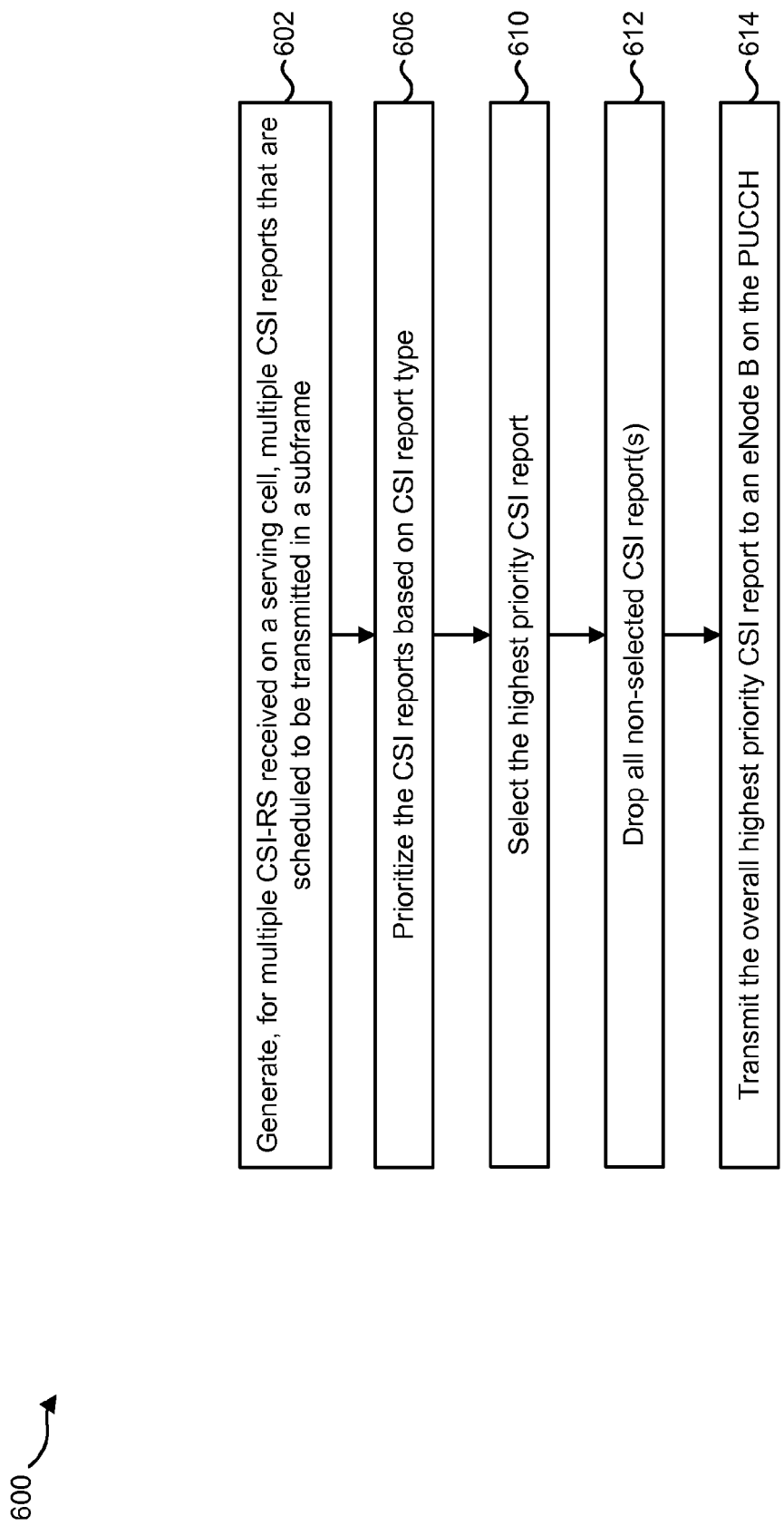
FIG. 9 is a flow diagram of a method for collision resolution among transmission schedules of uplink control information (UCI)
Figure 10:
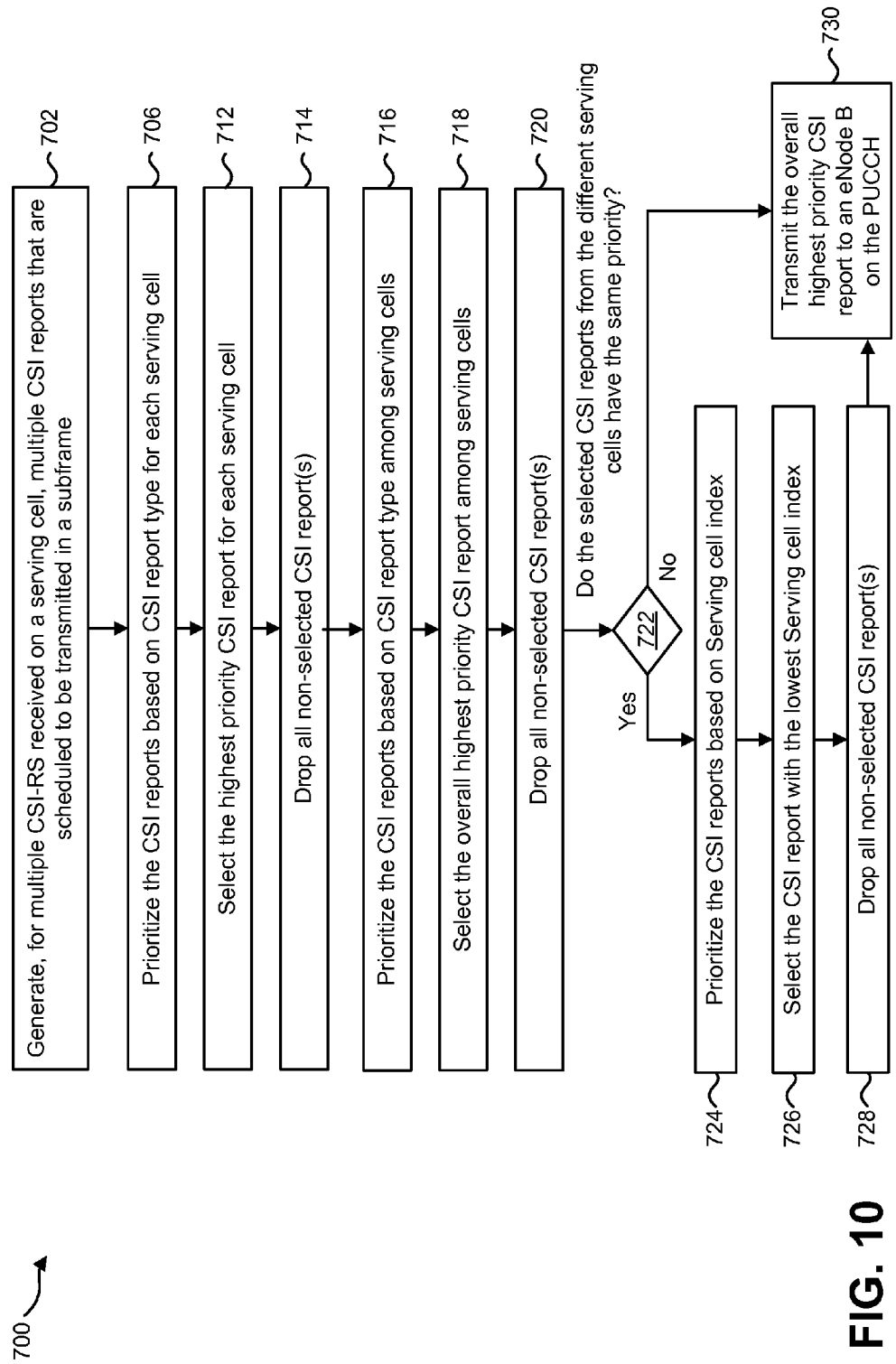
FIG. 10 is a flow diagram of another method for collision resolution among transmission schedules of uplink control information (UCI)
Figure 11:
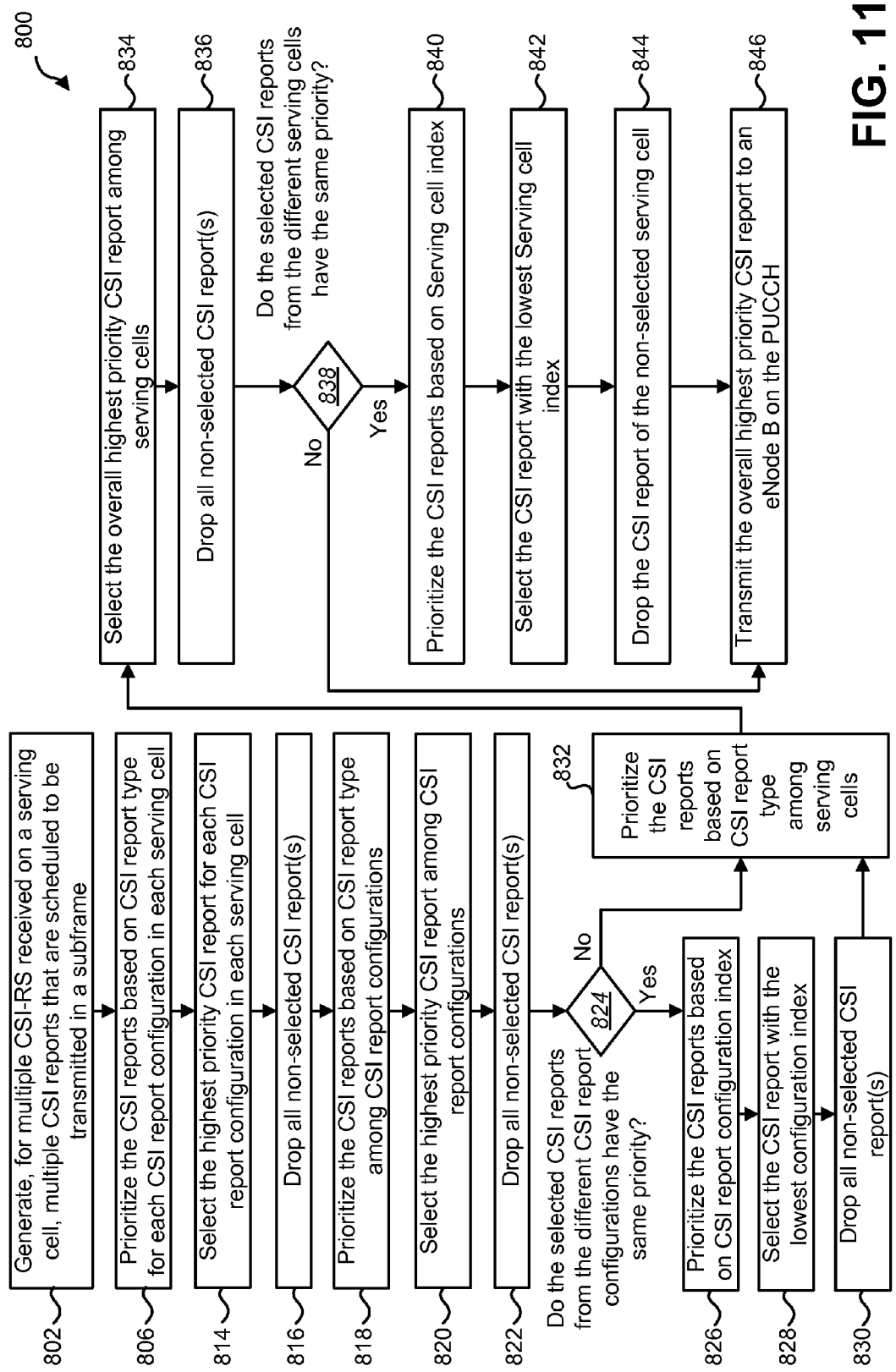
FIG. 11 is a flow diagram of yet another method for collision resolution among transmission schedules of uplink control information (UCI)

FIGS. 9-11 relate to systems and methods in which collision resolution among transmission schedules of uplink control information (UCI) 328 may be employed. For example, FIGS. 9-11 may provide examples of selected methods of prioritization within a single serving cell. In other words, FIGS. 9-11 may provide examples for determining 506 a highest priority channel state information (CSI) report 251 using a method of prioritization for each serving cell.

FIG. 9 is a flow diagram of a method 600 for collision resolution among transmission schedules of uplink control information (UCI) 328. The method 600 may be performed by a user equipment (UE) 104. In one configuration, the method 600 may be performed by a channel state information (CSI) selection module 257 on the user equipment (UE) 104. The method 600 may include one or more examples of using a selected prioritization method to determine a highest priority channel state information (CSI) report 251.

The user equipment (UE) 104 may generate 602, for multiple CSI-RS received on a serving cell, multiple channel state information (CSI) reports 236 that are scheduled to be transmitted in a subframe. Thus, there may be a collision between the multiple channel state information (CSI) reports 236.

The method of prioritization may be reporting-type based. In other words, the method of prioritization may be selected based on the priority of the reporting type (or content). For example, reporting types that support a rank indicator (RI) may be selected over reporting types that do not.

The user equipment (UE) 104 may prioritize 606 the CSI report(s) 236 based on CSI report type (also referred as to PUCCH reporting type, PUCCH CSI reporting type, CSI reporting type, etc.). The user equipment (UE) 104 may assign a higher priority to the CSI report(s) 236 that support RI. In other words, a channel state information (CSI) report 236 that supports RI may be assigned higher priority than a channel state information (CSI) report 236 that does not support RI. As another example, as can be seen in Table 2, channel state information (CSI) reports 236 with RI included in the type (type {3}, {5} or {6}) may be prioritized over channel state information (CSI) reports 236 without RI included in the type. As can be seen in Table 3 above, channel state information (CSI) reports 236 with RI included in the type (type {3}, {3a'}, {3b'}, {3c'}, {5}, {5a'}, {5b'}, {5c'}, {6}, {6a'}, {6b'} or {6c'}) may have a higher priority than channel state information (CSI) reports 236 without RI included in the type.

The user equipment (UE) 104 may prioritize the CSI report(s) 236 based on other CSI report type (also referred as to PUCCH reporting type, PUCCH CSI reporting type, CSI reporting type, etc.). For example, the channel state information (CSI) report 236 content may be related to a First-RS, a Second-RS or Aggregated-RS CSI report types. In one configuration, First-RS related report types may be given higher priority than Second-RS related report types. Additionally, First-RS second-RS related report types may be given higher priority than Aggregated-RS related report types. In other words, the Aggregated-RS related CSI report types may be given lower priority than First-RS and/or Second-RS CSI report types.

In one configuration, Aggregated CSI related CSI report types may be given higher priority than First-RS and/or Second-RS CSI report types. In other words, Aggregated CSI related report types may be given higher priority than First-RS related report types. Additionally, First-RS second-RS related report types may be given higher priority than the Second-RS report types.

In one configuration, the user equipment (UE) 104 may prioritize 608 the CSI report(s) 236 that have wideband CQI, wideband PMI, INTER-CSI-RS-PHASE and/or INTER-CSI-RS-AMPLITUDE types over CSI report(s) 236 that support sub-band CQI. As one example, CSI report type {7} and/or {8} may have a higher priority than CSI report type {1}, {1a}, {1b'}, {1c'}, {1d'} and/or {1e'}. In other words, two levels of prioritization may be needed in if it is determined that RI or wideband first PMI is included in the type and if sub-band CQI is included in the type.

The user equipment (UE) 104 may select 610 the highest priority channel state information (CSI) report 251. If there is a collision of a channel state information (CSI) report 236 within one serving cell with a channel state information (CSI) report 236 of the same serving cell, the user equipment (UE) 104 may select 610 the highest priority channel state information (CSI) report 251 based on the reporting-type based prioritization as explained above. FIG. 10 below describes the case of multiple serving cells.

After selecting the highest priority channel state information (CSI) report 251, the user equipment (UE) 104 may drop 612 all non-selected CSI report(s) 236. For example, in the case of collision of a channel state information (CSI) report 236 with a PUCCH reporting type that include RI of one serving cell with a channel state information (CSI) report 236 with a PUCCH reporting type that does not support RI of the same serving cell, the latter CSI report with PUCCH reporting type that does not support RI has lower priority and may be dropped.

The user equipment (UE) 104 may then transmit 614 the overall highest priority channel state information (CSI) report 251 to an eNode B 102. The user equipment (UE) 104 may transmit 614 the overall highest priority channel state information (CSI) report 251 to an eNode B 102 using the physical uplink control channel (PUCCH).

In some configurations, the method of prioritization may be similar to Release-10 in that only one channel state information (CSI) report 236 configuration is supported. However, the prioritization method 600 described in connection with FIG. 9 may additionally support reporting types for more than one CSI-RS in one serving cell. Further, the prioritization method 600 may support reporting types for aggregated CQI, PMI, PTI, RI, INTER-CSI-RS-PHASE and INTER-CSI-RS-AMPLITUDE. In other words, the prioritization method may be based, in part, on whether the channel state information (CSI) report 236 is associated with a CSI-RS or aggregated CSI. Thus, one benefit of the prioritization method described in connection with FIG. 9 is the similarity to existing mechanisms. This allows for less change in hardware design and in implementation. However, the prioritization method is different, in part, in that it supports more than one measurement (e.g., First-RS, Second-RS and Aggregated-RS).

It should also be noted that the steps taken in FIG. 9 may be performed in varying order. As an example, the method of prioritization may be adjusted. For instance, the user equipment (UE) 104 may first prioritize channel state information (CSI) reports 236 that support RI type and then prioritize based on other CSI report type (or content). Alternatively, the user equipment (UE) 104 may first prioritize channel state information (CSI) reports 236 based on CSI report type (or content) other than RI type and then prioritize the remaining channel state information (CSI) reports 236 using RI type (e.g., assign a higher priority to channel state information (CSI) reports 236 that have an RI type). Additionally, the user equipment (UE) 104 may skip prioritization steps once a highest priority channel state information (CSI) report 251 is obtained. In other words, if prioritizing based on channel state information (CSI) reports 236 that support RI type yields a highest priority channel state information (CSI) report 251, the user equipment (UE) 104 may skip prioritizing channel state information (CSI) reports 236 based on other CSI report type (or content).

FIG. 10 is a flow diagram of another method 700 for collision resolution among transmission schedules of uplink control information (UCI) 328. FIG. 10, in general, may refer to the case of multiple serving cells. The method 700 may be performed by a user equipment (UE) 104. In one configuration, the method 700 may be performed by a channel state information (CSI) selection module 257 on the user equipment (UE) 104. If the user equipment (UE) 104 is configured with more than one serving cell, the user equipment (UE) 104 may transmit a channel state information (CSI) report 236 of only one serving cell in any given subframe. In this case, prioritization may be performed based on both reporting-type as well as another approach, such as priority based on serving cell index. In other words, when prioritization cannot select the highest priority channel state information (CSI) report 251 based on type (or content), additional levels of prioritizations may be employed. These additional levels may be cell-index based priority. For example, the channel state information (CSI) report configuration may specify the priority method to use. The method 700 may include one or more examples of using a prioritization method to determine a highest priority channel state information (CSI) report 236.

The user equipment (UE) 104 may generate 702, for multiple CSI-RS received on a serving cell, multiple channel state information (CSI) reports 236 that are scheduled to be transmitted in a subframe. Thus, there may be a collision between the multiple channel state information (CSI) reports 236.

The user equipment (UE) 104 may prioritize 706 the CSI report(s) 236 based on CSI report type in each serving cell. This reporting-type based prioritization may be similar to the prioritization step discussed in connection with step 606 in FIG. 9. The user equipment (UE) 104 may select 712 the highest priority channel state information (CSI) report 251. After selecting the highest priority channel state information (CSI) report 251, the user equipment (UE) 104 may drop 714 all non-selected CSI report(s) 236 in each serving cell.

The user equipment (UE) 104 may be configured with more than one serving cell. However, only one channel state information (CSI) report 236 can be transmitted in a given subframe. Thus, even if the user equipment (UE) 104 has selected 712 the highest priority channel state information (CSI) report 251 for each serving cell, collisions between the highest priority CSI reports 251 for the multiple serving cells may still occur.

Here, the user equipment (UE) 104 may prioritize 716 the CSI report(s) 236 based on CSI report type among the CSI reports 236 of the serving cells. This reporting-type based prioritization may be similar to the prioritization step discussed in connection with step 606 in FIG. 9, but among each serving cells. The user equipment (UE) 104 may select 718 the overall highest priority channel state information (CSI) report 251 among the CSI reports 236 of the serving cells based on the reporting-type based prioritization. For a given subframe, in cases where a collision between a channel state information (CSI) report 236 with reporting type of one serving cell and channel state information (CSI) report 236 with reporting type of another serving cell occurs, the channel state information (CSI) report 236 with higher priority reporting type may be selected and others may be dropped 720.

The user equipment (UE) 104 may determine 722 whether the selected channel state information (CSI) reports 236 from the different serving cells have the same priority. For a given subframe, in cases where a collision between channel state information (CSI) reports 236 of different serving cells with reporting types of the same priority, the user equipment (UE) 104 may prioritize 724 the CSI report(s) 236 based on serving cell index among the CSI reports 236 of the serving cells and the channel state information (CSI) report 236 of the serving cell with the lower or lowest serving cell index (i.e., ServCellIndex) may be selected 726. The channel state information (CSI) report 236 of all other serving cells may be dropped 728. ServCellIndex may be configured by RRC signaling.

Other parameters besides serving cell index may also be used. For example, if there are multiple channel state information (CSI) reports 236, the user equipment (UE) 104 may use a predefined component carrier (CC) 208 (or cell 285) prioritization rule specified by radio resource control (RRC) signaling to determine the highest priority channel state information (CSI) report 251. The prioritization rule specified by radio resource control (RRC) signaling may prioritize channel state information (CSI) reports 236 based on the corresponding component carrier (CC) 208 (or cell 285) 247 of each channel state information (CSI) report 236 (e.g., CC1>CC2>CC3).

Once the user equipment (UE) 104 has determined a highest priority channel state information (CSI) report 251 using a method of prioritization for each serving cell, the user equipment (UE) 104 may transmit 730 the overall highest priority channel state information (CSI) report 251 to an eNode B 102 on the PUCCH.

FIG. 11 is a flow diagram of yet another method 800 for collision resolution among transmission schedules of uplink control information (UCI) 328. The method 800 may be performed by a user equipment (UE) 104. In one configuration, the method 800 may be performed by a channel state information (CSI) selection module 257 on the user equipment (UE) 104. The method 800 may include one or more examples of using a selected prioritization method to determine a highest priority channel state information (CSI) report 251.

The user equipment (UE) 104 may generate 802, for multiple CSI-RS received on a serving cell, multiple channel state information (CSI) reports 236 that are scheduled to be transmitted in a subframe. Thus, there may be a collision between the multiple channel state information (CSI) reports 236.

The method of prioritization may involve multiple steps and/or levels, including optional steps and levels. For example, one level of prioritization may include reporting-type prioritization of each channel state information (CSI) report 236 while another level of prioritization may include reporting-configuration prioritization of each channel state information (CSI) report 236. Additionally, another level of prioritization may include cell-indexes of each channel state information (CSI) report 236. Further, each level may include one or more steps for determining a highest priority channel state information (CSI) report 251 using a method of prioritization for each serving cell.

The user equipment (UE) 104 may prioritize 806 the CSI report(s) 236 based on CSI report type in each CSI report configuration in each serving cell. This reporting-type based prioritization may be similar to the prioritization step discussed in connection with step 606 in FIG. 9. The user equipment (UE) 104 may select 814 the highest priority channel state information (CSI) report 251. After selecting the highest priority channel state information (CSI) report 251, the user equipment (UE) 104 may drop 816 all non-selected CSI report(s) 236 in each serving cell.

The user equipment (UE) 104 may be configured with more than one CSI report configurations. However, only one channel state information (CSI) report 236 can be transmitted in a given subframe. Thus, even if the user equipment (UE) 104 has selected 814 the highest priority channel state information (CSI) report 251 for each CSI report configuration for each serving cell, collisions between the highest priority CSI reports 251 for the multiple CSI report configurations may still occur. Here, the user equipment (UE) 104 may prioritize 818 the CSI report(s) 236 based on CSI report type among the CSI reports 236 of the serving cells. This reporting-type based prioritization may be similar to the prioritization step discussed in connection with step 606 in FIG. 9, within each serving cell. The user equipment (UE) 104 may select 820 the overall highest priority channel state information (CSI) report 251 among the CSI reports 236 of the CSI report configurations based on the reporting-type based prioritization. For a given subframe, in cases where a collision between a channel state information (CSI) report 236 with reporting type of one serving cell and channel state information (CSI) report 236 with reporting type of another serving cell occurs, the channel state information (CSI) report 236 with higher priority reporting type may be selected and others may be dropped 822.

The user equipment (UE) 104 may determine 824 whether the selected channel state information (CSI) reports 236 from the different CSI report configurations have the same priority. For a given subframe, in cases where a collision between channel state information (CSI) reports 236 of different CSI configurations with reporting types of the same priority occurs, the user equipment (UE) 104 may prioritize 826 the CSI report(s) 236 based on CSI configuration index or CSI-RS index among the CSI report configurations. The channel state information (CSI) report 236 of the serving cell with the lower or lowest CSI report configuration index (or CSI-RS index) may be selected 828 and all other CSI reports 236 may be dropped 830. The reporting type-based prioritization among the CSI reports 236 of the CSI report configurations may be eliminated and only CSI report configuration index (or CSI-RS index) based prioritization may be applied. CSI report configuration index or CSI-RS index may be configured by RRC signaling.

The user equipment (UE) 104 may be configured with more than one serving cell. However, only one channel state information (CSI) report 236 can be transmitted in a given subframe. Thus, even if the user equipment (UE) 104 has selected 828 the highest priority channel state information (CSI) report 236 for each serving cell, collisions between the highest priority CSI reports 251 for the multiple serving cells may still occur.

Here, the user equipment (UE) 104 may prioritize 832 the CSI report(s) 236 based on CSI report type among the CSI reports 236 of the serving cells. This reporting-type based prioritization may be similar to the prioritization step discussed in connection with step 606 in FIG. 9, within each serving cell. The user equipment (UE) 104 may select 834 the overall highest priority channel state information (CSI) report 251 among the CSI reports 236 of the serving cells based on the reporting-type based prioritization. The user equipment (UE) 104 may then drop 836 all non-selected CSI report(s) 236.

For a given subframe, in cases where a collision between a channel state information (CSI) report 236 with reporting type of one serving cell and channel state information (CSI) report 236 with reporting type of another serving cell occurs, the channel state information (CSI) report 236 with higher priority reporting type may be selected 834 and the other channel state information (CSI) report 236 with a lower priority reporting type may be dropped 836.

The user equipment (UE) 104 may determine 838 whether the selected channel state information (CSI) reports 236 from the different serving cells have the same priority. For a given subframe, in cases where a collision between channel state information (CSI) reports 236 of different serving cells with reporting types of the same priority occurs, the user equipment (UE) 104 may prioritize 840 the CSI report(s) 236 based on serving cell index among the CSI reports 236 of the serving cells and the channel state information (CSI) report 236 of the serving cell with the lower or lowest serving cell index (i.e., ServCellIndex) may be selected 842. The channel state information (CSI) report 236 of all other serving cells may be dropped 844. ServCellIndex may be configured by RRC signaling.

If the selected CSI reports 236 from the different serving cells do not have the same priority, the user equipment (UE) 104 may transmit 846 the overall highest priority channel state information (CSI) report 251 to an eNode B 102 on the PUCCH. Once the user equipment (UE) 104 has selected 842 an overall highest priority CSI report 251, the user equipment (UE) 104 may transmit 846 the overall highest priority channel state information (CSI) report 251 to an eNode B 102 on the PUCCH.

As noted previously herein, the steps may be performed in varying order. Additionally, steps may be made optional or may be omitted if a highest priority channel state information (CSI) report 251 has been selected before those steps occur.

Figure 12:
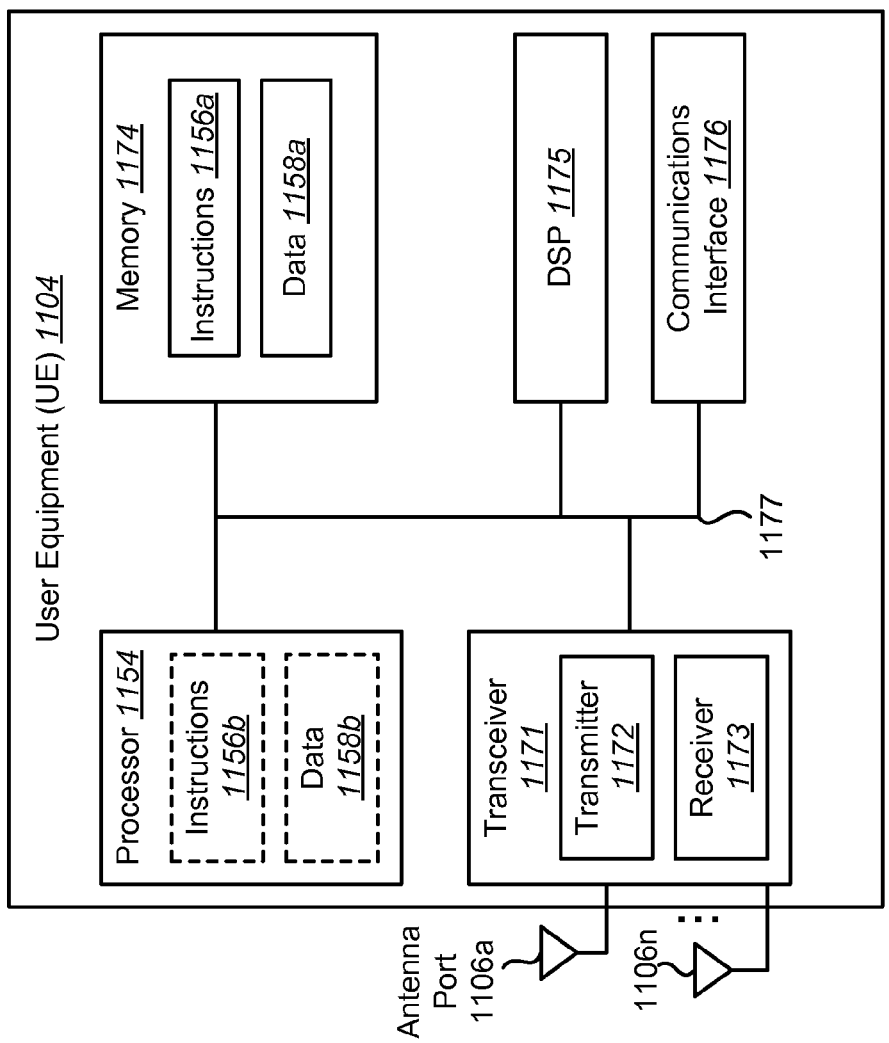
FIG. 12 illustrates various components that may be utilized in a user equipment (UE)

FIG. 12 illustrates various components that may be utilized in a user equipment (UE) 1104. The user equipment (UE) 1104 may be utilized as the user equipment (UE) 104 illustrated previously. The user equipment (UE) 1104 includes a processor 1154 that controls operation of the user equipment (UE) 1104. The processor 1154 may also be referred to as a CPU. Memory 1174, which may include both read-only memory (ROM), random access memory (RAM) or any type of device that may store information, provides instructions 1156*a* and data 1158*a* to the processor 1154. A portion of the memory 1174 may also include non-volatile random access memory (NVRAM). Instructions 1156*b* and data 1158*b* may also reside in the processor 1154. Instructions 1156*b* and/or data 1158*b* loaded into the processor 1154 may also include instructions 1156*a* and/or data 1158*a* from memory 1174 that were loaded for execution or processing by the processor 1154. The instructions 1156*b* may be executed by the processor 1154 to implement the systems and methods disclosed herein.

The user equipment (UE) 1104 may also include a housing that includes a transmitter 1172 and a receiver 1173 to allow transmission and reception of data. The transmitter 1172 and receiver 1173 may be combined into a transceiver 1171. One or more antennas 1106*a-n* are attached to the housing and electrically coupled to the transceiver 1171. An antenna port may be realized by one or more antennas.

The various components of the user equipment (UE) 1104 are coupled by a bus system 1177, which may include a power bus, a control signal bus, and a status signal bus, in addition to a data bus. However, for the sake of clarity, the various buses are illustrated in FIG. 12 as the bus system 1177. The user equipment (UE) 1104 may also include a digital signal processor (DSP) 1175 for use in processing signals. The user equipment (UE) 1104 may also include a communications interface 1176 that provides user access to the functions of the user equipment (UE) 1104. The user equipment (UE) 1104 illustrated in FIG. 12 is a functional block diagram rather than a listing of specific components.

Figure 13:
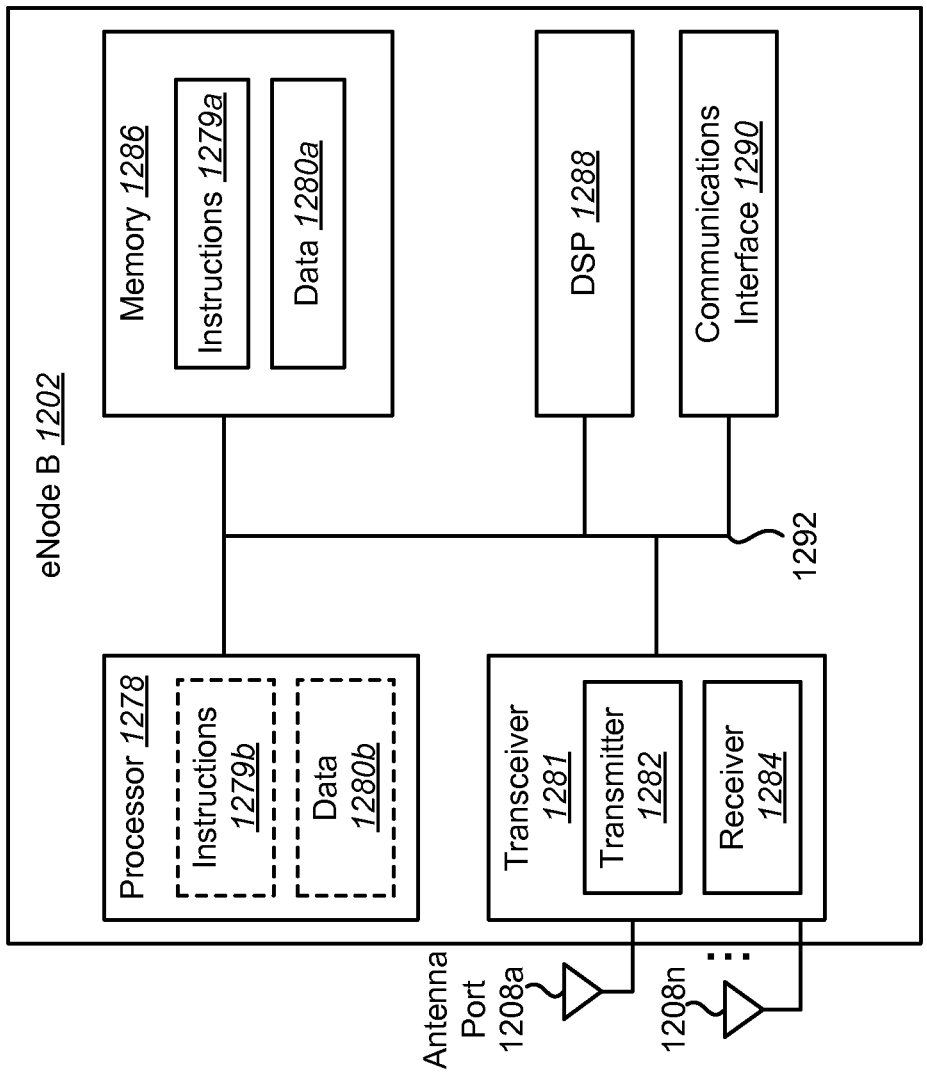
FIG. 13 illustrates various components that may be utilized in an eNode B.

FIG. 13 illustrates various components that may be utilized in an eNode B 1202. The eNode B 1202 may be utilized as the eNode B 102 illustrated previously. The eNode B 1202 may include components that are similar to the components discussed above in relation to the user equipment (UE) 1104, including a processor 1278, memory 1286 that provides instructions 1279*a* and data 1280*a* to the processor 1278, instructions 1279*b* and data 1280*b* that may reside in or be loaded into the processor 1278, a housing that includes a transmitter 1282 and a receiver 1284 (which may be combined into a transceiver 1281), one or more antenna ports 1208*a-n* electrically coupled to the transceiver 1281, a bus system 1292, a DSP 1288 for use in processing signals, a communications interface 1290 and so forth.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. In addition, "determining" can include receiving (e.g., receiving information), accessing (e.g., accessing data in a memory) and the like. Also, "determining" can include resolving, selecting, choosing, establishing and the like.

The phrase "based on" does not mean, "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for selecting a channel state information (CSI) report on a user equipment (UE), comprising:
   receiving multiple periodic CSI reporting configurations for multiple periodic CSI reporting of a same single serving cell, where each of the multiple periodic CSI reporting configurations is configured with its own different respective configuration index;
   generating each CSI report of the single serving cell based on each of the multiple periodic CSI reporting configurations with its own different respective configuration index and including CSI of the single serving cell; and
   in case of a collision among the multiple periodic CSI reports of the same single serving cell to be transmitted in a subframe, selecting, within the same single serving cell, a CSI report to be transmitted among the multiple periodic CSI reports of the same single serving cell based on priorities of the multiple periodic CSI reports, wherein
   in the selecting step, CSI reports of Physical Uplink Control Channel (PUCCH) reporting types of lower priority of the multiple periodic CSI reports of the same single serving cell are dropped and in case of collision among CSI reports with PUCCH reporting type of the same priority of the multiple periodic CSI reports of the same single serving cell, all CSI reports of the multiple periodic CSI reports except the CSI report with a lowest configuration index are dropped.

2. A user equipment (UE) comprising:
   a processor;
   memory in electronic communication with the processor;
   instructions stored in the memory, the instructions being executable to:
   receive multiple channel state information (CSI) reporting configurations for multiple periodic CSI reporting of a same single serving cell, where each of the multiple periodic CSI reporting configurations is configured with its own different respective configuration index;
   generate each CSI report of the single serving cell based on each of the multiple periodic CSI reporting configurations with its own different respective configuration index and including CSI of the single serving cell; and in case of a collision among the multiple periodic CSI reports of the same single serving cell to be transmitted in a subframe, select within the same single serving cell a CSI report to be transmitted among the multiple periodic CSI reports of the same single serving cell based on priorities of the multiple periodic CSI reports, wherein CSI reports of Physical Uplink Control Channel (PUCCH) reporting types of lower priority of the multiple periodic CSI reports of the same single serving cell are dropped and in case of collision among CSI reports with PUCCH reporting type of the same priority of the multiple periodic CSI reports of the same single serving cell, all CSI reports of the multiple periodic CSI reports except the CSI report with a lowest configuration index are dropped.

3. An evolved Node B (eNode B), comprising:
a processor;
memory in electronic communication with the processor;
instructions stored in the memory, the instructions being executable to:
   receive coded uplink control information (UCI) that includes at least one channel state information (CSI) report from a user equipment (UE); and
   in case of a collision among multiple periodic CSI reports of a same single serving cell to be transmitted in a subframe, decode the received UCI based on priorities of the at least one CSI report, wherein multiple periodic CSI reporting configurations for multiple periodic CSI reporting of the single serving cell are received, where each of the multiple periodic CSI reporting configurations is configured with its own different respective configuration index, and each CSI report of the same single serving cell based on each CSI reporting configuration with its own different respective configuration index comprises CSI of the same single serving cell, the one of the multiple periodic CSI reports of the same single serving cell is prioritized within the same single serving cell such that CSI reports of Physical Uplink Control Channel (PUCCH) reporting types of lower priority of the multiple periodic CSI reports of the same single serving cell are dropped and in case of collision among CSI reports with PUCCH reporting type of the same priority of the multiple periodic CSI reports of the same single serving cell, all CSI reports of the multiple periodic CSI reports except the CSI report with a lowest configuration index are dropped.

* * * * *